United States Patent [19]

Seraji

[11] Patent Number: 5,430,643
[45] Date of Patent: Jul. 4, 1995

[54] CONFIGURATION CONTROL OF SEVEN DEGREE OF FREEDOM ARMS

[75] Inventor: Homayoun Seraji, La Crescenta, Calif.

[73] Assignee: The United States of America as represented by the Administrator of the National Aeronautics and Space Administration, Washington, D.C.

[21] Appl. No.: 849,629

[22] Filed: Mar. 11, 1992

[51] Int. Cl.⁶ .............................................. G05B 13/00
[52] U.S. Cl. ........................... 364/167.01; 318/568.11; 318/568.24; 901/9
[58] Field of Search .................... 364/167.01; 901/2, 3, 901/4, 5, 6, 8, 19, 20; 395/80, 85; 318/560, 561, 563, 564, 568.11, 568.12, 568.19, 568.24

[56] References Cited

U.S. PATENT DOCUMENTS

| | | | |
|---|---|---|---|
| 4,156,835 | 5/1979 | Whitney et al. | 318/561 |
| 4,547,858 | 10/1985 | Horak | 901/15 X |
| 4,594,671 | 6/1986 | Sugimoto et al. | 364/513 |
| 4,680,519 | 7/1987 | Chand et al. | 318/568 |
| 4,706,204 | 11/1987 | Hattori | 901/3 X |
| 4,725,942 | 2/1988 | Osuka | 395/97 X |
| 4,725,965 | 2/1988 | Keenan | 364/513 |
| 4,794,547 | 12/1988 | Nishida | 364/513 |
| 4,808,063 | 2/1989 | Haley | 414/730 |
| 4,828,451 | 5/1989 | Mikoshi et al. | 414/680 |
| 4,828,453 | 5/1989 | Martin et al. | 901/15 X |
| 4,835,710 | 5/1989 | Schnelle et al. | 364/513 |
| 4,893,254 | 1/1990 | Chan et al. | 364/513 |
| 4,967,126 | 10/1990 | Gretz et al. | 318/568.19 |
| 4,972,347 | 11/1990 | Tarvin et al. | 364/474.28 |
| 4,975,856 | 12/1990 | Vold | 364/474.36 X |
| 4,999,553 | 3/1991 | Seraji | 901/9 X |
| 5,020,001 | 5/1991 | Yamamoto et al. | 901/2 X |
| 5,049,796 | 9/1991 | Seraji et al. | 364/192 X |
| 5,053,687 | 10/1991 | Merlet | 318/568.2 |
| 5,150,026 | 9/1992 | Seraji et al. | 364/191 X |
| 5,155,423 | 10/1992 | Karlen et al. | 318/568.1 X |
| 5,214,749 | 5/1993 | Brown | 364/424.02 X |

*Primary Examiner*—Roy N. Envall, Jr.
*Assistant Examiner*—Brian C. Oakes
*Attorney, Agent, or Firm*—John H. Kusmiss; Thomas H. Jones; Guy M. Miller

[57] ABSTRACT

A seven-degree-of-freedom robot arm with a six-degree-of-freedom end effector is controlled by a processor employing a 6-by-7 Jacobian matrix for defining location and orientation of the end effector in terms of the rotation angles of the joints, a 1 (or more)-by-7 Jacobian matrix for defining 1 (or more) user-specified kinematic functions constraining location or movement of selected portions of the arm in terms of the joint angles, the processor combining the two Jacobian matrices to produce an augmented 7 (or more)-by-7 Jacobian matrix, the processor effecting control by computing in accordance with forward kinematics from the augmented 7-by-7 Jacobian matrix and from the seven joint angles of the arm a set of seven desired joint angles for transmittal to the joint servo loops of the arms. One of the kinematic functions constrains the orientation of the elbow plane of the arm. Another one of the kinematic functions minimizing a sum of gravitational torques on the joints. Still another one of the kinematic functions constrains the location of the arm to perform collision avoidance. Generically, one of the kinematic functions minimizes a sum of selected mechanical parameters of at least some of the joints associated with weighting coefficients which may be changed during arm movement. The mechanical parameters may be velocity errors or position errors or gravity torques associated with individual joints.

24 Claims, 12 Drawing Sheets

CONFIGURATION CONTROL OF SEVEN DEGREE OF FREEDOM ARMS

BACKGROUND OF THE INVENTION

1. Technical Field

The invention is related to the use of the configuration control method disclosed in U.S. Pat. No. 4,999,553 by one of the inventors herein to the control of seven degree of freedom robot arms, using a forward kinematic approach.

2. Background Art

U.S. Pat. No. 4,999,553, the disclosure of which is hereby incorporated herein by reference, discloses a configuration control method employed in the present invention.

References

The background of the present invention is discussed below relative to the following references by referring to them by the bracketed numbers associated with each reference as follows:

[1] J. M. Hollerbach: "Optimum kinematic design for a seven degree of freedom manipulator," Proc. 2nd Intern. Symp. on Robotics Research, Kyoto, Japan, August 1984, pp. 215-222.

[2] J. Lenarcic, and A. Umek: "Experimental evaluation of human arm kinematics," Proc. 2nd Intern. Symp. on Experimental Robotics, Toulouse, France, June 1991.

[3] D. E. Whitney: "Resolved motion rate control of manipulators and human prostheses," IEEE Trans. Man-Machine Systems, 1969, Vol. MMS-10, No. 2, pp. 47-53.

[4] A. Li'egeois: "Automatic supervisory control of the configuration and behavior of multibody mechanisms," IEEE Trans. Systems, Man and Cybernetics, 1977, Vol. SMC-7, No. 12, pp. 868-871.

[5] R. V. Dubey, J. A. Euler, and S. M. Babcock: "An efficient gradient projection optimization scheme for a 7 DOF redundant robot with spherical wrist," Proc. IEEE Intern. Conf. on Robotics and Automation, Philadelphia, April 1988, pp. 28-36.

[6] Y. Nakamura and H. Hanafusa: "Task priority based redundancy control of robot manipulators," Proc. 2nd Intern. Symp. on Robotics Research, Kyoto, August 1984.

[7] A. A. Maciejewski and C. A. Klein: "Obstacle avoidance for kinematically redundant manipulators in dynamically varying environments," Intern. Journ. of Robotics Research, 1985, Vol. 4, No. 3, pp. 109-117.

[8] C. W. Wampler: "Inverse kinematic functions for redundant manipulators," Proc. IEEE Intern. Conf. on Robotics and Automation, Raleigh, April 1987, pp. 610-617.

[9] J. Baillieul: "Kinematic programming alternatives for redundant manipulators," Proc. IEEE Intern. Conf. on Robotics and Automation, St. Louis, March 1985, pp. 722-728.

[10] K. Anderson and J. Angeles: "Kinematic inversion of robotic manipulators in the presence of redundancies," Intern. Jour. of Robotics Research, 1989, Vol. 8, No. 6, pp. 80-97.

[11] H. Seraji: "Configuration control of redundant manipulators: Theory and implementation," IEEE Trans. on Robotics and Automation, 1989, Vol. 5, No. 4, pp. 472-490.

[12] J. D. Farrell, J. M. Thompson, J. P. Karlen, H. I. Vold and P. H. Eismann: "Modular, configurable, kinematically redundant manipulators," Proc. Japan-USA Symposium on Flexible Automation, Kyoto, July 1990, pp. 303-308.

[13] J. J. Craig: Robotics—Mechanics and Control/, Addison Wesley Publishing Company, New York, 1986.

[14] D. E. Whitney: "The mathematics of coordinated control of prosthetic arms and manipulators," ASME Journ. Dyn. Syst., Meas. and Control, 1972, Vol. 94, No. 14, pp. 303-309.

[15] K. Kreutz, M. Long, and H. Seraji: "Kinematic analysis of 7 DOF anthropomorphic arms," Proc. IEEE Intern. Conf. on Robotics and Automation, Cincinnati, May 1990, Vol. 2, pp. 824-830.

[16] R. Colbaugh, H. Seraji, and K. Glass: "Obstacle avoidance for redundant robots using configuration control," Journal of Robotic Systems, 1989, Vol. 6, No. 6, pp. 721-744.

[17] H. Seraji and R. Colbaugh: "Improved configuration control for redundant robots," Journal of Robotic Systems, 1990, Vol. 7, No. 6, pp. 897-928.

[18] Y. Nakamura and H. Hanafusa: "Inverse kinematic solutions with singularity robutness for robot manipulator control," ASME Journ. Dyn. Syst., Meas. and Control, 1986, Vol. 108, No. 3, pp. 163-171.

[19] C. W. Wampler and L. J. Leifer: "Applications of damped least-squares methods to resolved-rate and resolved-acceleration control of manipulators," ASME Journ. Dyn. Syst., Meas. and Control, 1988, Vol. 110, No. 1, pp. 31-38.

[20] H. Seraji: "Task-based configuration control of redundant manipulators," Journal of Robotic Systems, 1992, Vol. 9, No. 3.

[21] E. G. Gilbert and D. W. Johnson: "Distance functions and their application to robot path planning in the presence of obstacles," IEEE Journ. of Robotics and Automation, 1985, Vol. 1, No. 1, pp. 21-30.

[22] C. A. Klein and C. H. Huang: "Review of pseudoinverse control for use with kinematically redundant manipulators," IEEE Trans. Systems, Man and Cybernetics, 1983, Vol. SMC-13, No. 3, pp. 245-250.

[23] R. Schnurr, M. O'Brien, and S. Cofer: "The Goddard Space Flight Center Robotics Technology Testbed," Proc. Second NASA Conf. on Space Telerobotics, Pasadena, January 1989, Vol. 3, pp. 491-500.

1. Introduction

It has been recognized that robot arms with seven or more degrees-of-freedom (DOF) offer considerable dexterity and versatility over conventional six DOF arms [1]. These high-performance robot arms are kinematically redundant since they have more than the six joints required for arbitrary placement of the end-effector in the three-dimensional workspace. Kinematically redundant arms have the potential to approach the capabilities of the human arm, which also has seven independent joint degrees-of-freedom [2].

Although the availability of the "extra" joints can provide dexterous motion of the arm, proper utilization of this redundancy poses a challenging and difficult problem. Redundant manipulators have an infinite number of joint motions which lead to the same end-effector trajectory. This richness in the choice of joint motions complicates the manipulator control problem considerably. Typically, the kinematic component of a redundant manipulator control scheme must generate a set of joint angle trajectories, from the infinite set of possible trajectories, which causes the end-effector to follow a desired trajectory while satisfying additional constraints, such as collision avoidance, servomotor torque minimization, singularity avoidance, or joint limit avoidance. Developing techniques to simultaneously achieve end-effector trajectory control while meeting additional task requirements is known as the redundancy resolution/problem, since the motion of the manipulator joints must be "resolved" to satisfy both objectives.

Since redundancy is an important evolutionary step toward versatile manipulation, research activity in redundancy resolution and related areas has grown considerably in recent years, [e.g. 3–10]. For the most part, researchers have been working with a set of analytical tools based on linearized differential/kinematics models. Previous investigations of redundant manipulators have often focused on local/optimization for redundancy resolution by using the Jacobian pseudoinverse to solve the instantaneous relationship between the joint and end-effector velocities. Redundancy resolution based on the Jacobian pseudoinverse was first proposed by Whitney [3] in 1969, and the null-space projection improvement was proposed by Liegeois [4] in 1977. Over the past two decades, most researchers have continued to develop variations of the pseudoinverse approach primarily because the complex nonlinear forward and inverse kinematics models have deterred further investigations into new redundancy resolution schemes. A conceptually simple approach to control of redundant manipulator configuration has been developed recently based on augmentation of the manipulator forward kinematics [11]. This approach covers a wide range of applications and enables a major advancement in both understanding and developing new redundancy resolution methods. This paper presents the applications of the configuration control approach to a large class of redundant industrial robot arms with seven degrees-of-freedom.

The paper is organized as follows. Section 2 describes the kinematics of the 7 DOF Robotics Research arm and gives an overview of the configuration control approach. Various applications of the configuration control approach to the 7 DOF arm providing elbow control, collision avoidance, and optimal joint movement are given in Section 3. Section 4 describes the laboratory setup and the implementation of configuration control for real-time motion control of the 7 DOF arm, with elbow positioning for redundancy resolution. Conclusions drawn from this work are given in Section 5.

2. Motion Control of 7 DOF Arms

In this section, we describe the kinematics of the 7 DOF Robotics Research arm under study and discuss the motion control of this arm using the configuration control approach.

2.1 Kinematics of 7 DOF Robotics Research Arm

The Robotics Research (RR) arm is one of the few kinematically-redundant manipulators that is commercially available at the present time [12]. The Model K1207 RR arm has been purchased by JPL and similar models by other NASA centers for research and development of technologies applicable to the NASA Space Telerobotics Projects.

The Robotics Research arm has an anthropomorphic design with seven revolute joints, as shown in FIG. 1 and has nonzero offsets at all the joints. The arm is composed of a number of "modules" with roll and pitch motions. The shoulder joint with roll and pitch motions moves the upper-arm; the elbow joint with roll and pitch actions drives the forearm; and the wrist roll and pitch rotations together with the tool-plate roll move the hand. Essentially, the 7 DOF arm is obtained by adding the upper-arm roll as the 7th joint to a conventional 6 DOF arm design. The RR arm is supported by a pedestal at the base.

For kinematic analysis of the RR arm, coordinate frames are assigned to the links in such a way that the joint rotation $\theta_i$ is about the coordinate axis $z_i$ and the base frame $\{x_0,y_0,z_0\}$ is attached to the pedestal. The two consecutive frames $\{x_{i-1},y_{i-1},z_{i-1}\}$ with origin $O_{i-1}$ and $\{x_i,y_i,z_i\}$ with origin $O_i$ are related by the 4×4 homogeneous transformation matrix [13]

$$\begin{bmatrix} \cos\theta_i & -\text{SIN}\theta_i & 0 & 1A_{i-1} \\ \text{SIN}\theta_i\text{COS}\alpha_{i-1} & \text{COS}\theta_i\text{COS}\alpha_{i-1} & -\text{SIN}\alpha_{i-1} & -\text{SIN}\alpha_{i-1}d_i \\ \text{SIN}theta_i\text{SIN}\alpha_{i-1} & \text{COS}theta_i\text{SIN}\alpha_{i-1} & \text{COS}\alpha_{i-1} & \text{COS}\alpha_{i-1}d_i \\ 0 & 0 & 0 & 1 \end{bmatrix} \quad (1)$$

where $d_i$, $a_i$, and $\alpha_i$ are the link length, joint offset and twist angle respectively, given in Table 1. The transformation that relates the hand frame {7} to the base frame {0} is obtained as $$^0T_7 = {^0T_1} {^1T_2} {^2C_3} {^3C_4} {^4C_5} {^5C_6} {^6C_7} = \begin{pmatrix} & & & \vdots & \\ & R & & \vdots & p \\ & & & \vdots & \\ \cdots & \cdots & \cdots & \vdots & \cdots \\ 0 & 0 & 0 & \vdots & 1 \end{pmatrix} \quad (2)$$

where $R=\{r_{ij}\}$ is the 3×3 hand rotation matrix and $p=[x, y, z]^T$ is the 3×1 hand position vector with respect to the base. One common representation of the hand orientation is the triple roll-pitch-yaw Euler angles ($\rho$, $\beta$, $\gamma$). This three-parameter representation of hand orientation is subtracted from the hand rotation matrix R as follows [13]:

$$\rho = A\tan2(r_{32}, r_{33}) \quad (3)$$

$$\beta = A\tan2\left(-r_{31}, \sqrt{r_{11}^2 + r_{21}^2}\right)$$

$$\gamma = A\tan2(r_{21}, r_{11})$$

where Atan2 is the two-argument arc tangent function, and it is assumed that the pitch angle $\beta$ is not equal to or greater than ±90°. Therefore, the hand position and orientation can be described by the 6×1 vector $Y=[x, y, z, \rho, \beta, \gamma]^T$ the three-dimensional workspace.

The 6×7 Jacobian matrix $J_y$ relates the 6×1 hand rotational and translational velocity vector $$V = \begin{pmatrix} \omega \\ v \end{pmatrix}$$

to the 7×1 joint angular velocity vector $\dot{\theta}$ as $V = J_v \dot{\theta}$. The hand Jacobian matrix is computed using the vector cross-product form [14]

$$J_v = \begin{pmatrix} \hat{z}_1 & \hat{z}_2 & \cdots & \hat{z}_7 \\ \hat{z}_1 \times P^1 & \hat{z}_2 \times P^2 & \cdots & \hat{z}_7 \times P^7 \end{pmatrix} \quad (4)$$

where $\hat{z}_i$ is the unit vector along the z-axis of link frame {i}, and $P^i$ is the position vector from the origin $O_i$ of link frame {i} to the origin of hand frame {7}. The Jacobian matrix in (4) can be partitioned as $$J_v = \begin{pmatrix} J_{vr} \\ \cdots \\ J_{vt} \end{pmatrix},$$

where $J_{vr}$ and $J_{vt}$ designate the rotational and translational components of the Jacobian, that is, $\omega = J_{vr}\dot{\theta}$ and $v = J_{vt}\dot{\theta}$. In order to relate the joint velocities to the rate of change of the roll-pitch-yaw angles that represent the hand orientation, the rotational Jacobian $J_{vr}$ (4) is modified to yield [13]

$$\frac{d}{dt} = \begin{pmatrix} \rho \\ \beta \\ \gamma \end{pmatrix} = \begin{pmatrix} 0 & -SIN\gamma & COS\gamma COS\beta \\ 0 & COS\gamma & SIN\gamma COS\beta \\ 0 & 0 & -SIN\beta \end{pmatrix}^{-1} J_{vr}\dot{\theta} = \pi J_{vr}\dot{\theta} \quad (5)$$

where the transformation matrix II (5) maps $\omega$ to $$\begin{pmatrix} \dot{\rho} \\ \dot{\beta} \\ \dot{\gamma} \end{pmatrix}.$$

and det[II] = $-\cos\beta \neq 0$ since $\beta \neq \pm 90°$.

From (4) and (5), we obtain the 6×7 hand Jacobian matrix $$J_6 = \begin{pmatrix} J_{vt} \\ \cdots \\ \pi J_{vr} \end{pmatrix}$$

which relates $\dot{Y}$ to $\dot{\theta}$ as $Y = J_e(\theta)\dot{\theta}$. It is important to note that the computational efficiency can be creased significantly by exploiting the commonality of terms between the hand transformation matrix $^0T_7$ and the hand Jacobian matrix $J_e$.

Since the Robotics Research arm has seven joints, it offers one extra degree of joint redundancy for the task of controlling the six hand coordinates. The resolution of this single degree-of-redundancy is the subject of the next section.

SUMMARY OF THE INVENTION

A seven-degree-of-freedom robot arm with a six-degree-of-freedom end effector is controlled by a processor employing a 6-by-7 Jacobian matrix for defining location and orientation of the end effector in terms of the rotation angles of the joints, a 1 (or more)-by-7 Jacobian matrix for defining 1 (or more) user-specified kinematic functions constraining location or movement of selected portions of the arm in terms of the joint angles, the processor combining the two Jacobian matrices to produce an augmented 7 (or more)-by-7 Jacobian matrix, the processor effecting control by computing in accordance with forward kinematics from the augmented 7-by-7 Jacobian matrix and from the seven joint angles of the arm a set of seven desired joint angles for transmittal to the joint servo loops of the arms. One of the kinematic functions constrains the orientation of the elbow plane of the arm. Another one of the kinematic functions minimizing a sum of gravitational torques on the joints. Still another one of the kinematic functions constrains the location of the arm to perform collision avoidance. Generically, one of the kinematic functions minimizes a sum of selected mechanical parameters of at least some of the joints associated with weighting coefficients which may be changed during arm movement. The mechanical parameters may be velocity errors or position errors or gravity torques associated with individual joints.

Figure 1:
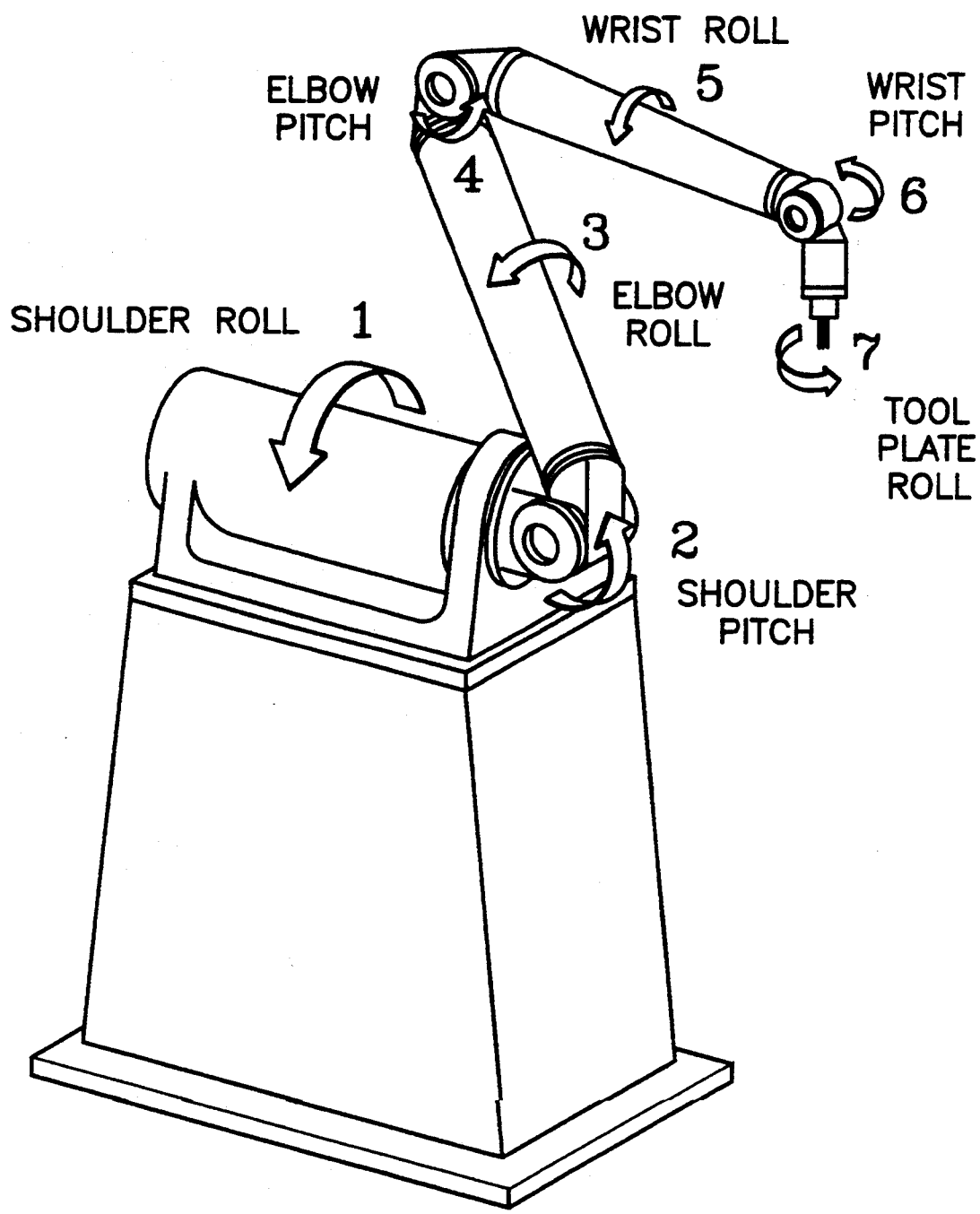
FIG. 1 is a perspective view of a seven degree of freedom robot arm of the type controlled in the present invention.

DETAILED DESCRIPTION OF THE INVENTION 2.2 Configuration Control of the 7 DOF Arm The configuration control approach introduced in [11] is a viable technique for resolution of redundancy and motion control of redundant manipulators. This approach is based on redundancy resolution at the position (i.e., task) level through augmentation of the manipulator forward kinematics by a set of user-defined kinematic functions $\Phi(\theta)=\{\phi_1(\theta),\ldots\phi_r(\theta)\}$, where r is the number of redundant manipulator joints. This is in contrast to the conventional Jacobian pseudoinverse methods which resolve the redundancy at the velocity (i.e., differential kinematics) level.

For the 7 DOF Robotics Research arm, the six hand position and orientation coordinates obtained in Section 2.1 are augmented by the scaler user-defined kinematic function $\phi$ to yield the $7 \times 1$ configuration vector $X=[Y^T,\phi]^T$. The redundancy resolution goal is then expressed as the additional task constraint $$\phi(\theta)=\phi_d(t) \quad (6)$$

that will be accomplished simultaneously with the basic task of controlling the hand motion $Y(\theta)=Y_d(t)$, where $\phi_d(t)$ and $Y_d(t)$ are the desired time variations of $\phi(\theta)$ and $Y(\theta)$ respectively. Since the functional forms of the kinematic function and its desired time evolution are at the user's discretion, this approach can accommodate a wide range of redundancy resolution goals such as arm posture control (i.e. elbow positioning [15]), satisfaction of a task constraint (e.g. collision avoidance [16]), or optimization of a kinematic performance measure (e.g. minimal joint movement [17]). This formulation puts the redundancy resolution on the same footing as the end-effector task, and treats them equally within a common format. As a consequence, configuration control schemes ensure cyclicity (i.e., conservativeness) of arm motion, in contrast to pseudoinverse-based methods.

The configuration control approach can be implemented either as a dynamic or a kinematic control law. In the dynamic control implementation [11], the configuration controller produces the appropriate joint torques $\tau(t)$ using a joint-space or a task-space formulation. In the kinematic control implementation [17], the controller generates the appropriate joint angle trajectories $\theta_d(t)$ which are then used as setpoints for the low-level joint servo-loops. In this paper, we adopt the kinematic configuration control approach due to ease of implementation. Since the Robotics Research arm has non-zero joint offsets, there are no closed-form analytical inverse kinematics solutions and therefore a differential kinematics approach must be adopted. The augmented differential kinematics model of the arm is obtained as $$\dot{X}(t) = \begin{pmatrix} J_e(\theta) \\ \cdots \\ J_c(\theta) \end{pmatrix} \dot{\theta}(t) = J(\theta)\dot{\theta}(t) \quad (7)$$

where $J_e(\theta)$ is the $6 \times 7$ hand Jacobian matrix obtained Section 2.1, $$J_c(\theta) = \frac{\partial \phi}{\partial \theta}$$

is the $1 \times 7$ Jacobian matrix associated with the kinematic function $\phi$, and $J(\theta)$ is the $7 \times 7$ augmented Jacobian matrix*Note that when $\phi(\theta)$ is defined as the gradient of an objective function to be optimized, J becomes the "extended" Jacobian proposed by Baillieul [9] for redundancy resolution. Therefore, the extended Jacobian method is retrieved as a special case of the configuration control approach when the latter is implemented as a differential kinematic controller with an optimization additional task. Assuming det=0, equation (7) is solved in discrete-time as $$\Delta\theta_d(N)=J^{-1}(\theta_n)[X_d(N+1)-X(N)] \quad (8)$$

where N is the sampling instant, $\theta$ and X are the actual values while $\theta_d$ and $X_d$ are the desired values. Note that the use of X in (8) corrects for linearization errors due to differential kinematics. The next desired joint angle is then computed from $\theta_d(N+1)=\theta_d(N)+\Delta\theta_d(N)$, and is sent as a setpoint to the joint servo-loops for tracking.

The configuration control framework allows the user to specify multiple additional tasks to be accomplished simultaneously with the basic task of hand motion. Suppose that $r(>1)$ additional task constraints are defined as $\phi_i(\theta)=\phi_{di}(t)$, $i=1,\ldots,r$. Then, the augmented differential kinematics model becomes $$\dot{X}_d = \begin{pmatrix} \dot{Y}_d \\ \cdots \\ \phi_{d1} \\ \cdots \\ \phi_{dr} \end{pmatrix} \begin{pmatrix} J_e \\ \cdots \\ J_{c1} \\ \cdots \\ J_{cr} \end{pmatrix} \dot{\theta} = J\dot{\theta} \quad (9)$$

The optimal (i.e. damped least-squares) solution of the over-determined set of equations (9) that has the smallest joint velocity $\|\dot{\theta}\|$ is given by [17-19] as $$\dot{\theta}=[J^TWJ+W_\nu]^{-1}J^T W \dot{X}_d \quad (10)$$

or in discrete-time implementation $$\Delta\theta_d(N)=[J^T(\theta_N)W J(\theta_N)+W_\nu]^{-1} J^T(\theta_N)W[X_d(N+1)-X(N)] \quad (11)$$

where $W=\text{diag}\{W_e,W_c\}$ and $W_\nu$ are the $(6+r)\times(6+r)$ and $7\times 7$ matrices of task error and joint velocity weighting factors specified by the user. Note that when $W_\nu=0$, $r=1$ and $\det[J]\neq 0$, equation (8) is retrieved from (10). The acquired solution (10) minimizes the scalar cost function $$L=\dot{E}_e^T W_e \dot{E}_e+\dot{E}_c^T W_c \dot{E}_c+\dot{\theta}^T W_\nu \dot{\theta} \quad (12)$$

where $\dot{E}_e=\dot{Y}_d-J_e\dot{\theta}$ and $\dot{E}_c=\dot{\Phi}_d-J_c\dot{\theta}$ are the basic task and additional task velocity errors. The task weighting factors $W_e$, $W_c$ enable the user to assign priorities to the different basic and additional task requirements. The joint velocity weighting factor $W_\nu$ allows the user to suppress large joint velocities near singularities, at the expense of small task errors. This is particularly important in redundant arm control because the complicated nature of the augmented Jacobian singularities deters any analytical characterization of the singular configurations.

Figure 2:
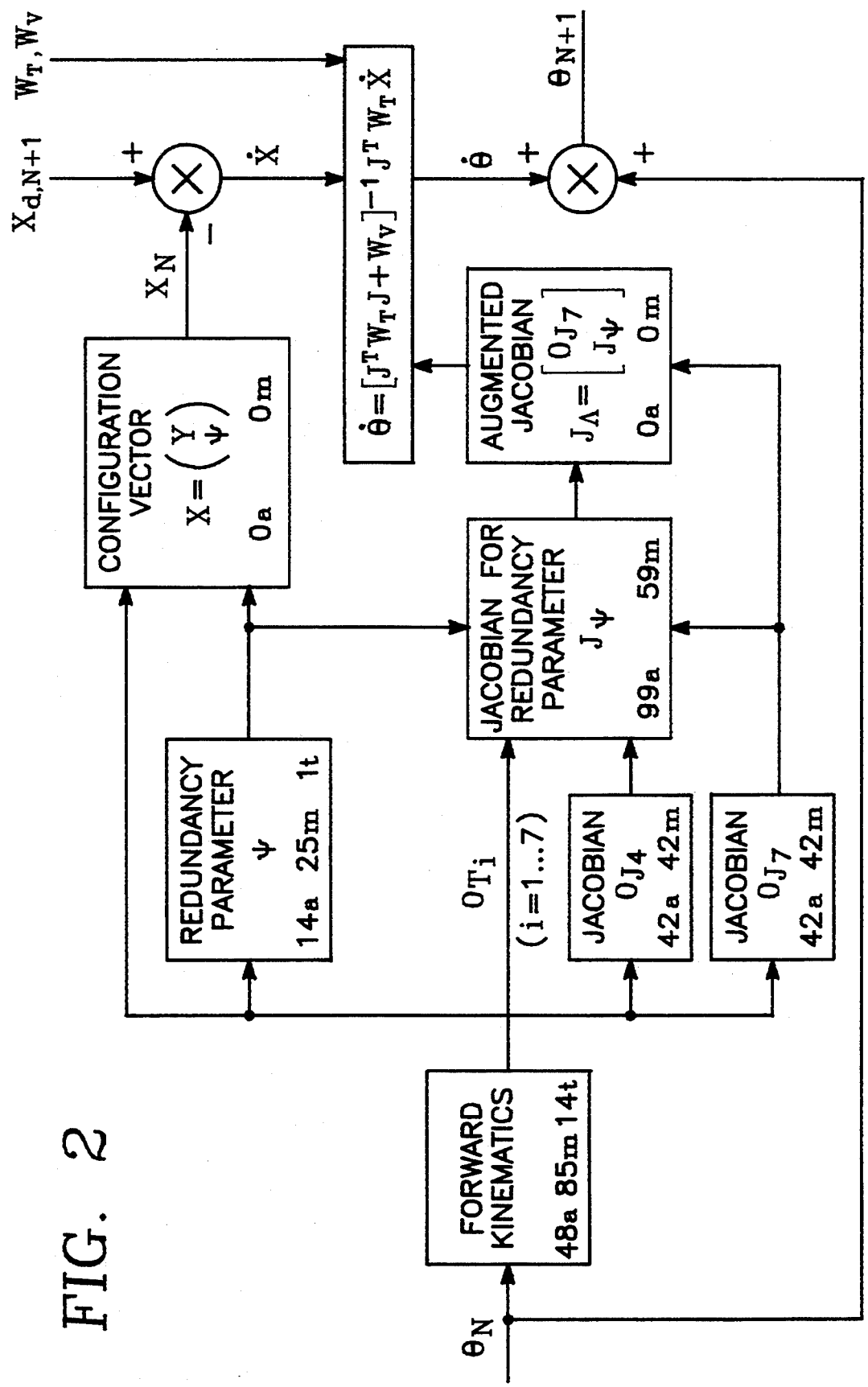
FIG. 2 is a block diagram of an architecture embodying the present invention.

An architecture corresponding to Equations (8) and (10) is illustrated in FIG. 2.

The ability to change the weighting factors on-line based on the task performance provides a general framework for incorporation of multiple constraints in redundant arm control. Equation (10) can be written as $$\dot{\theta} = \qquad (13)$$
$$\left[ W_v + J_e^T W_e J_e + \sum_{i=1}^{r} \omega_{ci} J_{ci}^T J_{ci} \right]^{-1} \left[ J_e^T W_e \dot{Y}_d + \sum_{i=1}^{r} \omega_{ci} \phi_{di} J_{ci}^T \right]$$

where $J_{ci}$ is the Jacobian related to $\phi_i$. Equation (13) shows the contribution of each additional task constraint to the optimal joint motion. This formulation can be used to "blend" multiple additional tasks or to "switch" between different additional tasks by proper selection of their weighting factors. For instance, for the 7 DOF arm, we can switch between elbow control and collision avoidance during task execution so that when the arm is far from workspace obstacles, $w_{el}=1$ and $w_{co}=0$ and direct elbow control will take precedence. As soon as potential collision is detected (from world model or sensory data), the collision avoidance goal becomes dominant and the corresponding weighting factor $w_{co}$ creases as the arm gets closer to the obstacle, at the expense of loss of direct elbow control by setting $w_{el}=0$. This feature is illustrated in Section 3, and is discussed in detail in [17].

The configuration control formulation can be used to meet diverse additional task constraints for redundancy resolution [20]. For instance, the redundancy can be used to control directly: a geometrical variable (such as coordinates of a point on the arm), a physical variable (e.g. a joint gravity torque), or a mathematical function (such as projected gradient of an optimization function). In the next section, we demonstrate three applications of configuration control for motion control of the 7 DOF Robotics Research arm. In each application, the single degree-of-redundancy is utilized to accomplish a different additional task objective; namely, elbow control, collision avoidance, and optimal joint movement.

3. Graphics Simulation of 7 DOF Arm Control

This section describes some of the simulations of the configuration control scheme for redundancy resolution and kinematic motion control of the Model K1207 7 DOF Robotics Research arm.

Figure 3:
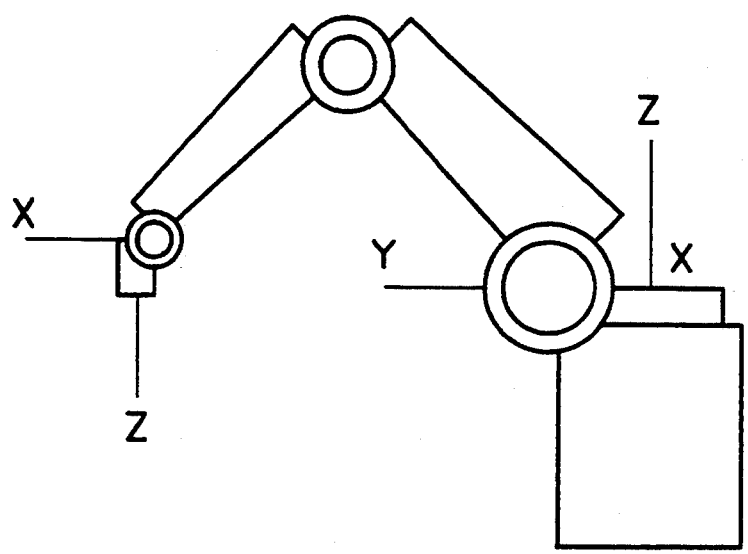
FIG. 3 is a diagram of the robot arm of FIG. 1 in one position of interest.

The Silicon Graphics IRIS 4D70-GT is a Workstation with both high-speed computing and graphics capabilities, and is used in this simulation study. A three-dimensional color rendering of the Robotics Research K1207 arm is built with a set of primitives that use the IRIS "C" language graphics library. When the program is run, it initially displays the arm and its state information on the IRIS screen as shown in FIG. 3. The rendering of the arm is centered on the screen with the joint angles, Cartesian hand coordinates, arm angle, manipulability indices, and trajectory time information displayed in a table in the lower left corner, the redundancy control mode is displayed in the upper left, and the user menu box (not shown) appears as needed in the upper right corner of the screen. Since the zero configuration of this particular arm is a singular configuration, the arm shown in this figure is in the user-defined "home" configuration. Simulation software is written in "C" and animates the kinematic control results as they are computed so as to move the arm continuously on the screen. FIGS. 4(a)–(d) show the evolution of the arm as it moves from an initial to a user-specified final configuration. The control law is computed and used to continuously change the arm configuration and the state information in the lower left corner of the screen is updated at every sampling instant. A simple cycloidal trajectory generator provides point-to-point straight-line Cartesian paths based on Cartesian goal points input by the user either from the keyboard or from the mouse. Alternatively, the user may use the mouse in teleoperation mode to directly control the arm in joint or Cartesian space, activating different degrees-of-freedom with the mouse buttons. Using a simple stacking feature, the user may save a sequence of intermediate points to a file for a later run. The user can also select from a number of redundancy resolution schemes for each task, adjust optimization parameters or obstacle location, plot the results of each run, or save the data for later analysis. The user may also rerun the simulation program, adjusting his viewing location and perspective on each run.

This interactive graphics simulation environment serves as an essential tool for development and validation of new control schemes for redundant 7 DOF arms. The IRIS also allows the user to simulate the robot workspace graphically and plan the task sequence. It can then be used for "task preview" by simulating the robot control algorithms and animating the task scenario. In this mode of operation, the IRIS can be used for operator training and rehearsal, prior to actual task execution. This preview mode is important in dealing with redundant arms, since it enables the user to explore various alternatives for redundancy resolution and can reveal unexpected behavior of the robot.

Several configuration control schemes for the 7 DOF Robotics Research arm have been designed and verified by simulation on the IRIS. The case studies presented here are samples selected from an extensive computer simulation study which was carried out to test the performance of the proposed control schemes. These cases are chosen for presentation because they illustrate the flexibility and versatility of the configuration control approach to redundant manipulators. Three case studies are presented in this section, namely: elbow control, collision avoidance, and optimal joint movement.

3.1 Elbow Control

Figure 5:
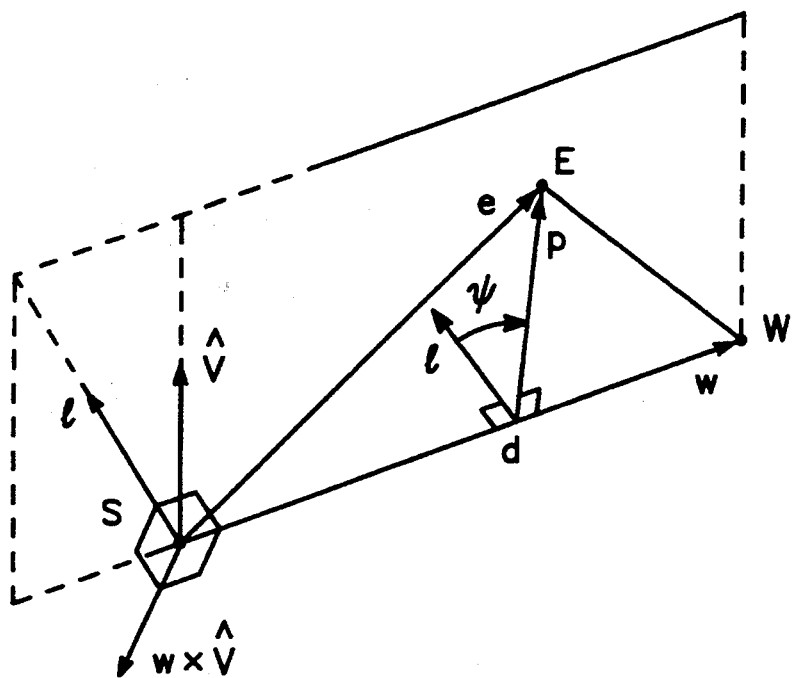
FIG. 5 is a diagram illustrating the coordinates employed in the detailed description of the invention below.
Figure 4B:
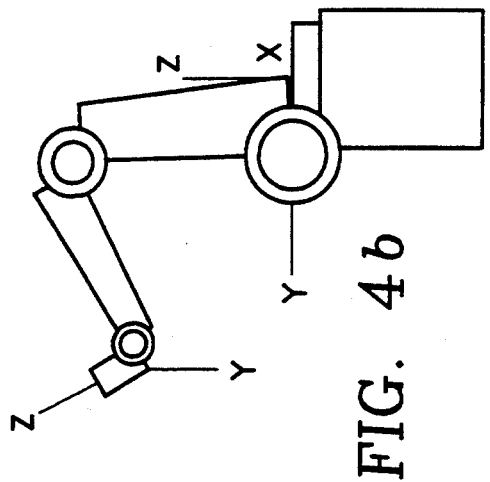
FIGS. 4a, 4b, 4c and 4d are diagrams of the robot arm of FIG. 1 in various positions of interest.
Figure 4D:
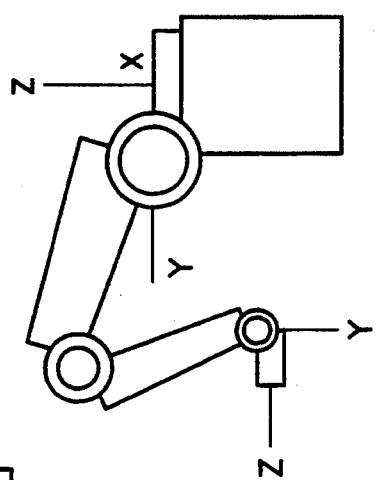
Figure 4A:
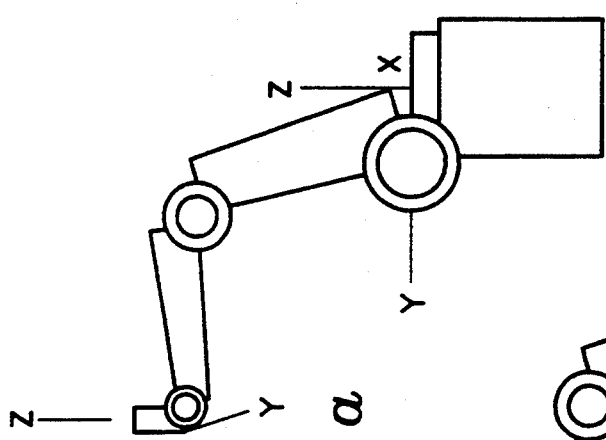
Figure 4C:
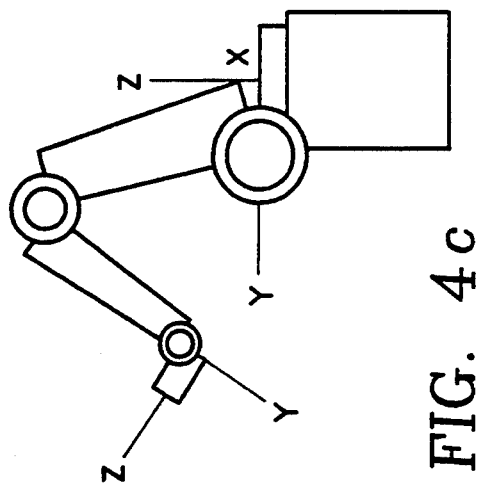

The presence of a redundant joint in the 7 DOF Robotics Research arm results in infinite distinct arm configurations with the same/hand position and orientation. This leads to a physical phenomenon known as "self-motion" or "orbiting," which is a continuous movement of the joints that leaves the hand motionless. The self-motion of the RR arm corresponds to the elbow point E traversing a circle around the line SW joining the shoulder S to the hand W, without moving the hand frame. Thus the elbow position, together with the hand coordinates, forms a complete representation of the geometrical posture (i.e., the physical shape) of the whole arm in the entire workspace. One natural representation of the elbow position is the "arm angle" $\Psi$ defined as the angle between the arm plane SEW and a reference plane, such as the vertical plane passing through the line SW, [15], as depicted in FIG. 5. The angle $\Psi$ succinctly characterizes the self-motion of the arm and uniquely specifies the elbow position for a given hand frame. Other viable representations of the elbow position are the x, y, or z Cartesian coordinates of the elbow (i.e., $E_x$, $E_y$, or $E_z$) in the base frame. The choice of $\Psi$ or a particular elbow coordinate is clearly dictated by the task that the arm is required to perform. In a recent paper [15], simple and computationally efficient methods of computing the arm angle $\Psi$ and the associated constraint Jacobian $J_\Psi$ are given, where $\dot{\Psi} = J_\Psi \dot{\theta}$. Following, $\Psi$ and $J_\Psi$ are computed from $$\psi = a\tan2[\hat{\omega}^T(\hat{V} \times p), \hat{V}^T p] \tag{14}$$

$$J_\psi = \frac{(\hat{\omega} \times p)^T}{\|p\|^2} E + \tag{15}$$

$$\left\{ \frac{\hat{V}^T\omega}{\|h\|^2}(\hat{\omega} \times \hat{p})^T - \frac{\hat{\omega}^T e}{\|\omega\| \cdot \|p\|^2}(\hat{\omega} \times p)^T \right\} W$$

where E and W are the Jacobian matrices related to the elbow and the wrist linear velocities and other symbols are defined in FIG. 5, with 'caret' designating a unit vector.

The user interacts with the IRIS Workstation by using the keyboard to enter the desired target position and orientation of the hand ($x_f, y_f, z_f, \rho_f, \beta_f, \gamma_f$) and the desired final arm angle $\Psi_f$, as well as the duration of motion $\tau$ and the sampling period $\Delta t$. The hand frame can alternatively be input using the mouse which essentially emulates a 6 DOF cursor. The trajectory generator software then computes smooth cycloidal trajectories for these seven variables to change them from their initial values ($x_0, Y_0, z_0, \rho_0, \beta_0, \gamma_0, \Psi_0$) to the final values in the specified time duration. For instance, a typical cycloidal trajectory for the desired arm angle $\Psi_d$ is $$\omega_d(t) = \begin{cases} \psi_0 + \frac{\psi_f - \psi_0}{2\pi}\left[\frac{2\pi t}{\tau} - \text{SIN}\frac{2\pi t}{\tau}\right] & 0 \le t \le \tau \\ \psi_f & \tau \le t \end{cases} \tag{16}$$

Note that only the ratio of elapsed time to motion time $\tau/t$ is needed for the trajectory generator. In discrete-time implementation, the number of samples during motion is equal to $\Delta t/\tau$. Note that, using the cycloidal functions, the hand moves on a straight-line path; since we obtain $$\frac{x - x_0}{x_f - x_0} = \frac{y - y_0}{y_f - y_0} = \frac{z - z_0}{z_f - z_0}$$

Figure 6:
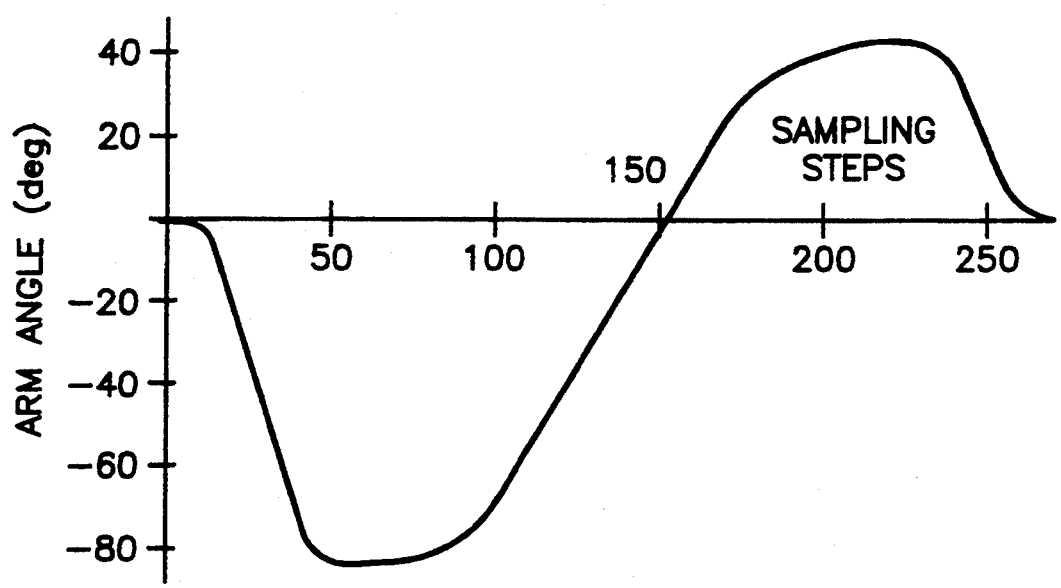
FIG. 6 is a graph illustrating the arm angle as a function of the number of sampling steps in one implementation of the invention.
Figure 12G:
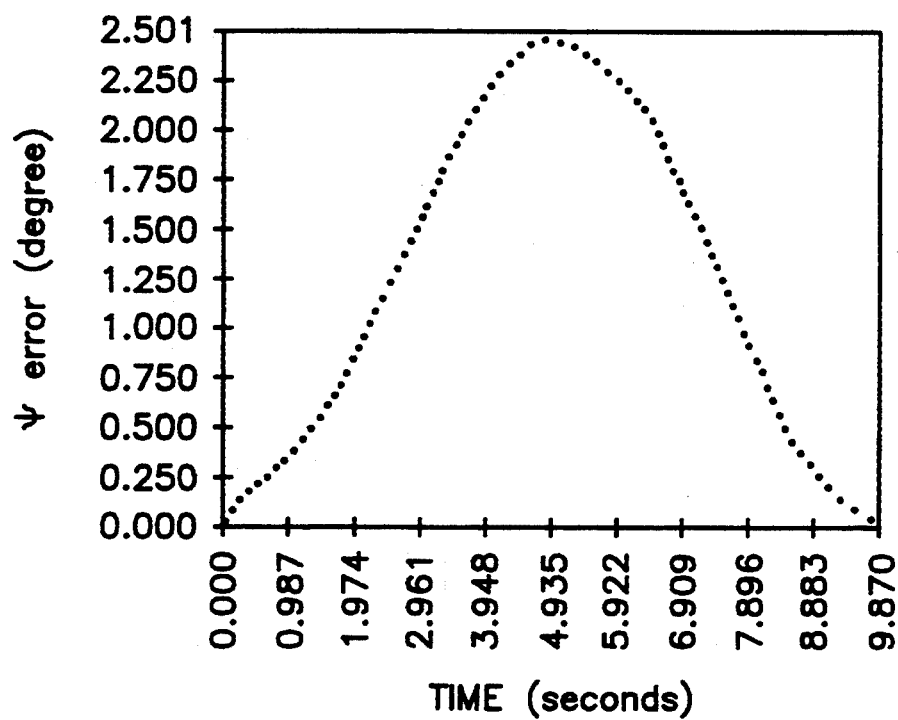
FIGS. 12a, 12b, 12c, 12d, 12e, 12f and 12g are graphs illustrating errors in respective parameters of joint position and joint angle as a function of time in an implementation of the invention.
Figure 7A:
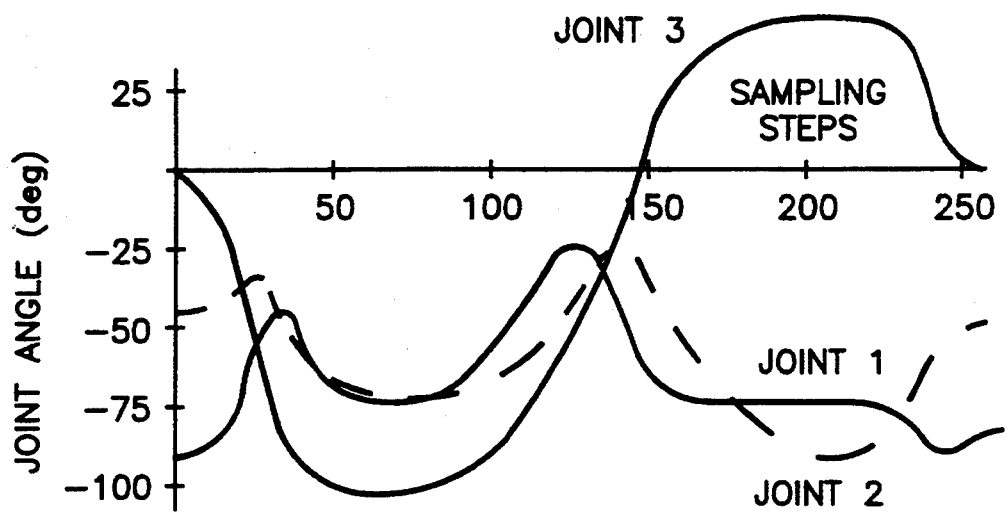
FIGS. 7a and 7b are graphs illustrating joint angles of respective joints of the arm of FIG. 1 as a function of the number of sampling steps in an implementation of the invention.
Figure 7B:
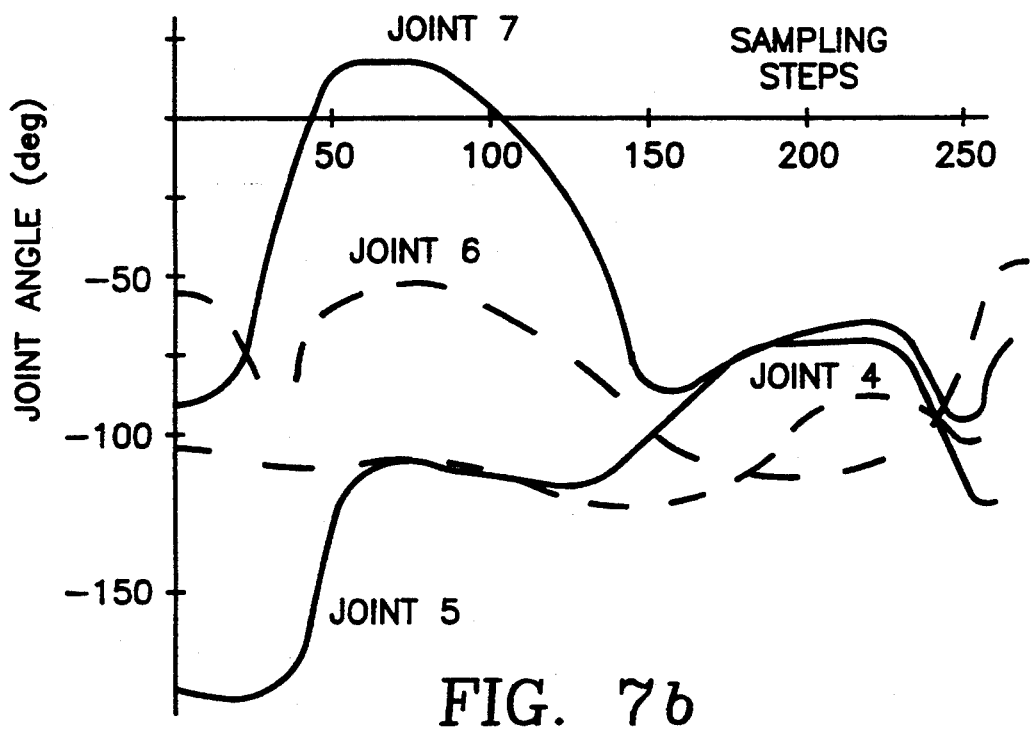

In this simulation study, the Robotics Research arm is initially at the joint configuration $\theta(0) = [-90°, -43.3°, 0°, -101°, -180°, -54.3°, -90°]^T$ This yields the initial hand configuration $P_0 = \{X=0, y=90, z=0, \rho=-90°, \beta=0°, \gamma=0°\}$ relative to the base frame and the initial arm angle $\Psi_0 = 0°$, where the position coordinates are in centimeters and the angles are in degrees. The hand is commanded to trace a triangle by making the successive moves:

$$P_0 \xrightarrow{\tau_1} P_1, P_1 \xrightarrow{\tau_2} P_2, P_2 \xrightarrow{\tau_3} P_0,$$

where
$P_1 = \{50, 50, 50, 0°, 0°, 0°\}$, $\Psi_1 = -90°$, $\tau_1 = 2.0$
$P_2 = \{-50, 50, 50, 0°, 0°, 0°\}$, $\Psi_2 = +45°$, $\tau_2 = 4.0$,
$\tau_3 = 1.0$ while $\Delta t = 0.025$ in all cases and the unit of time is the second. The kinematic configuration control scheme is used to compute the required joint motions that result in the commanded hand and arm angle trajectories. Note that $J_\psi$ from (15) is used in (10), and we set $W_e = I_6$, $W_c = 1$ and $W_v = 0$ since no arm singularities are encountered during the motion. FIG. 6 shows the executed motion of the elbow, in which the arm angle changes from 0° to −90° and then to +45° during the hand motion. The variations of the joint angles $\theta_1, \ldots, \theta_7$ to achieve the commanded arm motion are shown in FIGS. 7a–7b. These figures illustrate that all the seven joint angles return to their initial values at completion of the task. Thus, the initial and final arm configurations are identical and the robot has executed a cyclic (i.e., conservative) motion under configuration control.

3.2 Collision Avoidance

One of the advantages of the 7 DOF arm is the potential to use the "extra" DOF to maneuver in a congested workspace and avoid collision with obstacles by configuring the arm appropriately without perturbing the hand trajectory. In this formulation, all workspace obstacles are enclosed in convex volumes and each volume defines a "space of influence" (SOI) for the control law. In this study, the SOIs are assumed to be spheres in the three-dimensional workspace, but extension to other geometrical shapes is possible using distance functions [21]. In the configuration control framework, the collision avoidance requirement is formulated as a kinematic equality/constraint $$\phi(\theta) \triangleq d_c(\theta) - r_0 \ge 0 \tag{17}$$

where $d_c(\theta) = \|X_c(\theta) - X_0\|$ is the critical distance between the arm and the obstacle, $X_0$ is the position of the SOI center, $r_0$ is the radius of the SOI, and $X_c$ is the position of the "critical point" on the arm currently at minimum distance from the obstacle. Note that the location of the critical point $X_c$ and the critical distance $d_c$ are both configuration dependent and are continuously recomputed as described [16]. Two modes of operation are possible:

Case One $d_c(\theta) \ge r_0$: In this case, the equality constraint (17) is satisfied and the entire arm is outside the obstacle SOI. Therefore, the constraint is active/and the manipulator redundancy can be used to achieve other additional tasks, such as those in Sections 3.1 and 3.3.

Case Two $d_c(\theta) < r_0$: In this case, the equality constraint (17) is active/and the arm is inside the obstacle SOI. Thus, the redundancy is utilized to avoid collision with the obstacle by inhibiting the motion of the critical point on the arm in the direction toward the obstacle. To this end, (17) is replaced by the equality constraint $d_c(\theta) = r_0$, and the constraint Jacobian is obtained as $$J_c(\theta) = \frac{\partial \phi(\theta)}{\partial \theta} = \frac{\partial d_c(\theta)}{\partial \theta}.$$

The configuration control scheme can now be employed to achieve the desired hand motion as well as collision avoidance. However, in this formulation, the additional task constraint is either "on" or "off." This can lead to an undesirable rapid switching between the "on" and "off" conditions thus resulting a "chattering" phenomenon on the SOI boundary. Furthermore, switching between the collision avoidance task in Case Two and another additional task (such as elbow control) in Case One can cause discontinuity problems. The variable task weighting scheme alleviates both the chattering and discontinuity problems. In this scheme, the weighting factors $w_{el}$ and $w_{co}$ for the elbow control and collision avoidance tasks Cases One and Two are chosen as functions of the critical distance $d_c(\theta)$, instead of predefined constants. The use of variable weighting factors for the additional tasks allows the collision avoidance constraint to be incorporated gradually with the basic task, and furthermore circumvents the discontinuity problem in switching between different additional tasks.

Figure 8A:
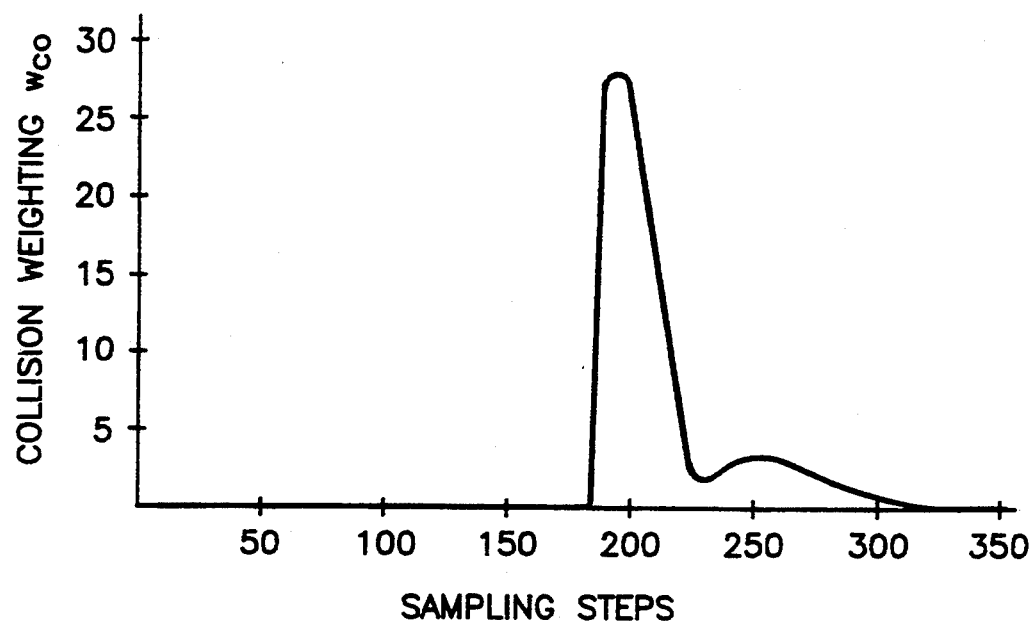
FIGS. 8a and 8b are graphs illustrating a collision weighting factor and a collision avoidance critical distance, respectively, as a function of the number of sampling steps in an implementation of the invention.
Figure 8B:
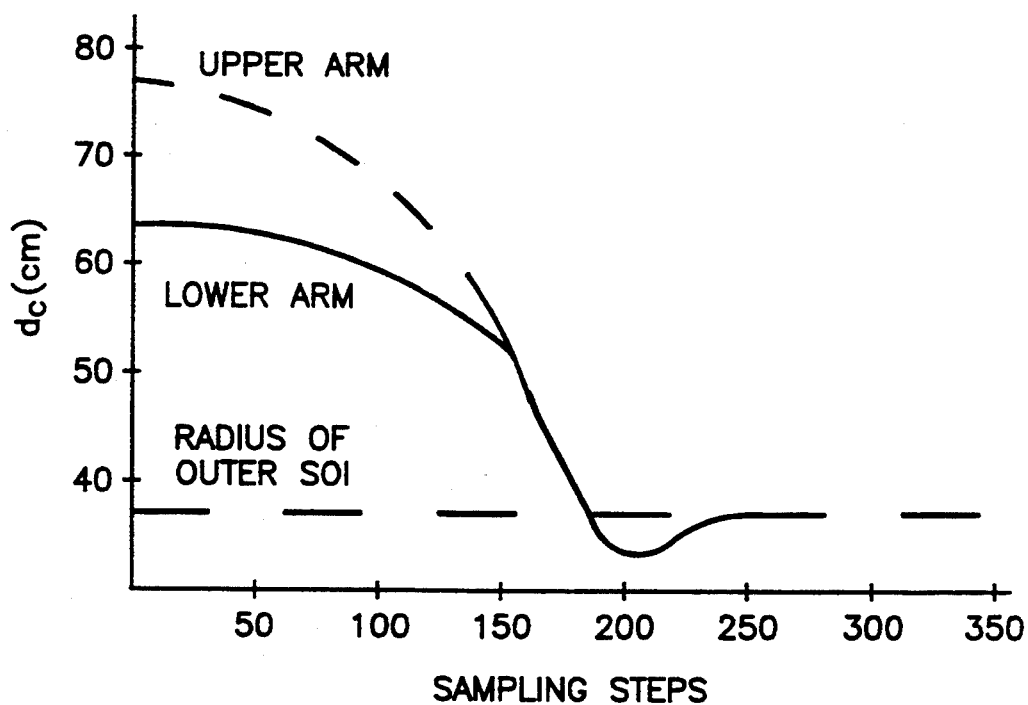
Figure 9:
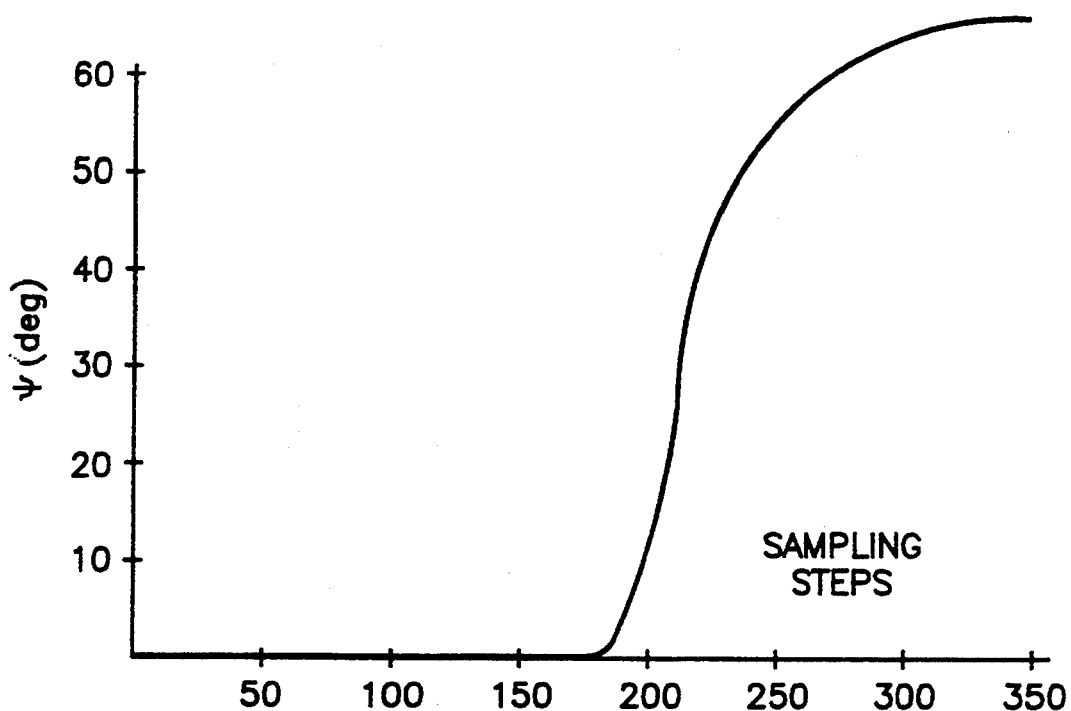
FIG. 9 is a graph illustrating the variation of the arm angle as a function of the number of sampling steps in an implementation of the invention.

In the simulation study, the Robotics Research arm is initially at the joint configuration $\theta(0)=[-90°, -44.7°, 0°, -89.4°, 0°, -135.8°, 90°]^T$. The task is to move the hand on a straight-line from the initial location $P_0=[0, 90,0, 0°, 0°, 90°]$ to the target location $P_1=[-90, 30, -30, 0°, 0°, 90°]$ $\tau=8.75$ seconds with $\Delta t=0.025$ such that during motion the arm avoids collision with a workspace obstacle. The obstacle is enclosed by two SOIs: an inner SOI which touches the actual obstacle boundary, and an outer SOI which allows for some "buffer." The inner and outer SOIs are concentric spheres with centers at $z_0=13.3$] and radii $r_i=8.5$ cm and $r_0=37.5$ cm. Each hand coordinate is required to track a cycloidal trajectory as described in Section 3.1. Initially, before the obstacle is encountered, it is required to keep the arm angle constant at its initial value of $\Psi=0°$ to resolve the redundancy. When the obstacle is encountered, the redundancy is used for collision avoidance at the expense of loss of elbow control. After the obstacle encounter, the arm angle should remain constant. In this simulation, when the arm is outside the outer SOI (Case One), we set $w_{el}=1$ and $w_{co}=0$ to achieve elbow control. As soon as potential collision is detected (Case Two), the redundancy resolution goal switches smoothly to collision avoidance by setting $w_{el}=0$ and increasing wco as an inverse square function of $d_c(\theta)$, that is $$w_{co} = \frac{10}{(d_c - r_i)^2} - \frac{10}{(r_o - 1r_i)^2} \quad (18)$$

for $d_c \leq r_O$. Using (18), when the arm is at the outer SOI boundary ($d_c=r_o$), we have $w_{co}=0$; and as the arm moves closer to the obstacle, $w_{co}$ creases rapidly so that $w_{co} \to \infty$ as $d_c \to r_i$. The variations of $w_{co}$ and the critical distance $d_c(\theta)$ are shown in FIGS. 8a–8b. It is seen that the increase in $w_{co}$ has hindered motion of the arm inside the inner SOI, thus ensuring that collision avoidance is successfully accomplished throughout the arm motion. The variation of the arm angle $\Psi(\theta)$ is shown in FIG. 9, and illustrates that the arm angle is held constant when the obstacle is not encountered, as expected.

3.3 Optimal Joint Movement

In this case study, the redundancy resolution goal is to distribute the hand motion among the joints in such a way that a weighted sum of joint movements is kept at minimum. Toward this end, the optimization objective function is selected as $$G(\theta) = \sum_{i=1}^{7} 0.5k_i[\theta_i(t) - \theta_i(0)]^2 \quad (19)$$

where $k_i$ is the weighting factor for joint i movement and $[\theta_i(t)-\theta_i(0)]^2$ denotes the current deviation of joint angle $\theta_i(t)$ from its initial position $\theta_i(0)$. The objective function $G(\theta)$ (19) represents the total instantaneous potential energy stored in seven hypothetical springs attached to the robot joints with stiffness coefficients $\{k_i\}$ and natural lengths $\{\theta_i(0)\}$. By choosing appropriate numerical values for $\{k_i\}$, the user can resolve the hand motion among the joints such that the joints with larger k move less at the expense of those with smaller k. The ability to penalize individual joint movement may also lead to a desirable distribution of joint torques for a given hand trajectory [17]. The condition for optimality of $G(\theta)$ subject to the end-effector constraint $Y=Y(\theta)$ has been found [17] to be $$N_e(\theta) \frac{\partial G(\theta)}{\partial \theta} = 0,$$

where $N_e$ is a $1 \times 7$ vector which lies in the null-space of the hand Jacobian $J_e$, that is $J_e N_e^T=0$. This implies that for optimality, the projection of the gradient of the objective function onto the null-space of the hand Jacobian must be zero. To achieve optimal joint movement, the kinematic function is defined as $$\phi(\theta) = N_e(\theta) \frac{\partial G(\theta)}{\partial \theta}$$

and its desired value is set to $\phi_d(t)=0$, to represent the optimality condition. The configuration control approach can then be applied to obtain the joint trajectories which cause the hand to attain the commanded motion with an optimal total joint spring energy.

Figure 10:
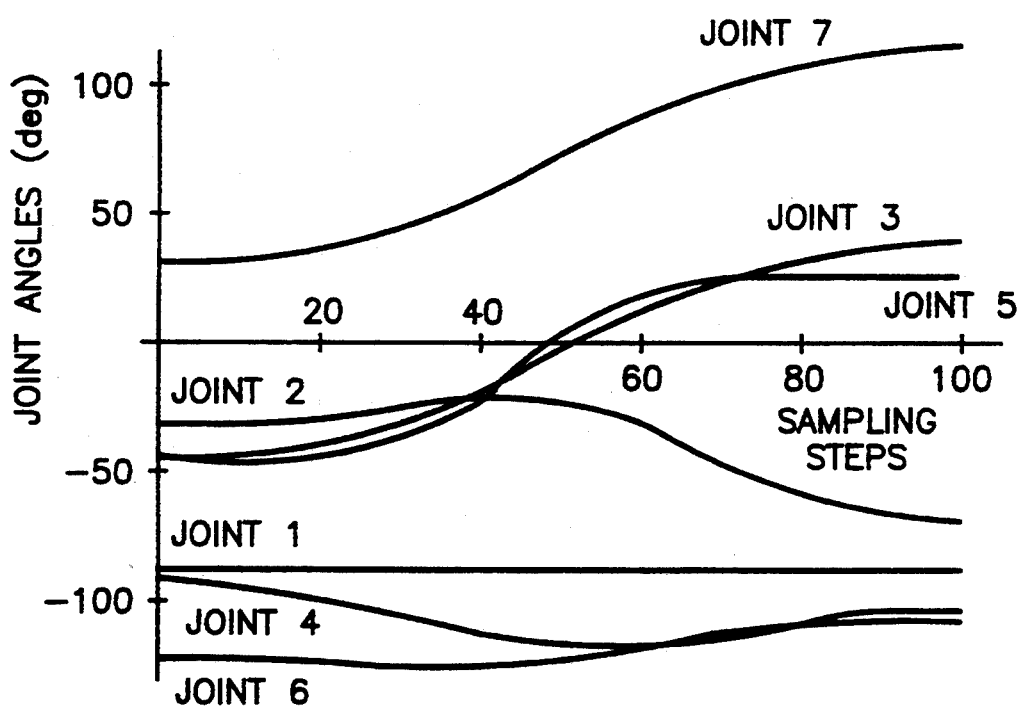
FIG. 10 is a graph illustrating various joint angles as a function of the number of sampling steps in an implementation of the invention.

In this simulation study, the arm is initially at $\theta(0)=[-89.1°, -32.1°, -45°, -91.5°, -47°, -126.6°, 29.7°]^T$ giving the initial hand coordinates as $P_0=[50, 70, 30, 0°, 0°, 90°]$. The hand is commanded to move on a straight-line to the target location $P_1=[-50, 70, -30, 90°, 0°, 0°]$ $\tau=2.5$ seconds with $\Delta t=0.025$, while the arm redundancy is used to achieve the hand trajectory with optimal joint movement. The user types in the stiffness coefficients of the joint springs $\{k_i\}=\{20,1,1,1,1,1,1\}$, where a large value for $k_1$ dictates the heavy penalty on joint 1 movement. The program then computes $$\phi(\theta) = N_e \frac{\partial G}{\partial \theta} \text{ and } J_c = \frac{\partial \phi}{\partial \theta}$$

and augments the hand Jacobian $J_e$ to obtain J. The required joint trajectories are then found by using (10) with $W_e=I_6$, $W_c=1$, $W_v=0$. The variations of the joint angles are given in FIG. 10, which shows that the first joint with a large weighting factor has moved considerably less than the other joints, as desired.

3.4 Alternative Redundancy Resolution Goals

In addition to the redundancy resolution goals discussed in Section 3.1–3.3, the user can select other criteria from a menu presented to him on the IRIS screen. This menu of redundancy resolution options is an area of current research, and analytical techniques that are being developed are added to the menu for test and validation. In this section, we shall present some of the items on the redundancy resolution menu.

(i) Joint Locking: The user can select a particular joint, say $\theta_j$, to be locked during the commanded hand motion. In this case, the relationship $\theta_j(t)=\theta_j(0)$ is treated as the additional task, with $J_c=[0, \ldots, 1, \ldots 0]$. The configuration control approach then attempts to move the hand using the remaining six joints while keeping $\theta_j$ constant. This is equivalent to deleting the j th column of $J_e$ to obtain the $6\times 6$ matrix $\hat{J}_e$ and then solving $Y=\hat{J}_e\dot{\theta}$ for the remaining six joints $\dot{\theta}$. The acquired solution for $\dot{\theta}$ depends on the locked value of $\theta_j$, namely $\theta_j(0)$. Note that for some selections of $\theta_j$, the resulting Jacobian $\hat{J}_e$ is always singular, which implies that from a physical point of view, the hand position and orientation can not be changed arbitrarily while $\theta_j$ is locked. The joint locking option is useful in investigating the fail-tolerance feature of the robot joints, i.e., preservation of hand motion despite a joint failure. In addition, this option can be exercised when the operator only wishes to perform the basic task of hand placement and orientation.

(ii) Joint Limit Avoidance: The joints of any robot have rotational limitations that can typically be expressed as $\alpha_j \leq \theta_j \leq \beta_j$, where $\alpha_j$ and $\beta_j$ are the lower and upper joint limits. One of the applications of redundancy is to resolve the hand motion among the joints such that their limits are not violated. The joint limit equality constraint is treated within the configuration control framework in a similar manner to the obstacle avoidance constraint in Section 5.2. The user can select the joint limits and command hand motion, and examine the robot performance. Since inequality constraints are treated as equality conditions for redundancy resolution, for some joint angles the augmented Jacobian can be singular and the problem may not have a solution.

(iii) Manipulability Maximization: A common objective function to be maximized by the utilization of redundancy is the hand manipulability index [15] defined as $\mu(\theta) = \sqrt{\det}$. This scalar index vanishes at the hand singular configurations where $J_e(\theta)$ is rank-deficient. Therefore, maximizing $\mu(\theta)$ during a prescribed hand motion leads to arm configurations which avoid the hand Jacobian singularities as much as possible. This solution can be obtained by following Section 5.3 with $G(\theta)$ replaced by $\mu(\theta)$. Note that in this case $\partial_\theta \partial^\mu$ must be computed numerically.

4. Real-Time Control of the 7 DOF Arm

In this section, we describe the implementation and experimental validation of the configuration control scheme on the 7 DOF Robotics Research arm. The laboratory setup is described first, followed by a description of a simple experiment. In this experiment, the configuration control approach is implemented for real-time control of the Robotics Research arm, with elbow positioning for redundancy resolution.

The Robotics Research Laboratory at JPL consists of one Model K1207 7 DOF arm and control unit from the Robotics Research Corporation, a VME-based chassis with MC 68020 processor boards, two 3 DOF industrial rate joysticks, a motorized lathe-bed, and a Silicon Graphics IRIS Workstation. The arm pedestal is mounted on a mobile platform of the lathe-bed which provides one additional degree-of-freedom. The arm control unit has an electronic servo-level interface, which allows the user to communicate directly with the joint servomotors at a sampling frequency of $f_s = 400$ Hz, i.e., a sampling period of $T_s = 2.5$ ms. The joint servomotors can be commanded in any of the four modes: position, velocity, torque, and current. This makes it possible to operate the arm under either kinematic or dynamic control schemes, and therefore provides a testbed for validation of different 7 DOF control laws. In the present implementation, all seven joints are commanded in the position mode.

Figure 11:
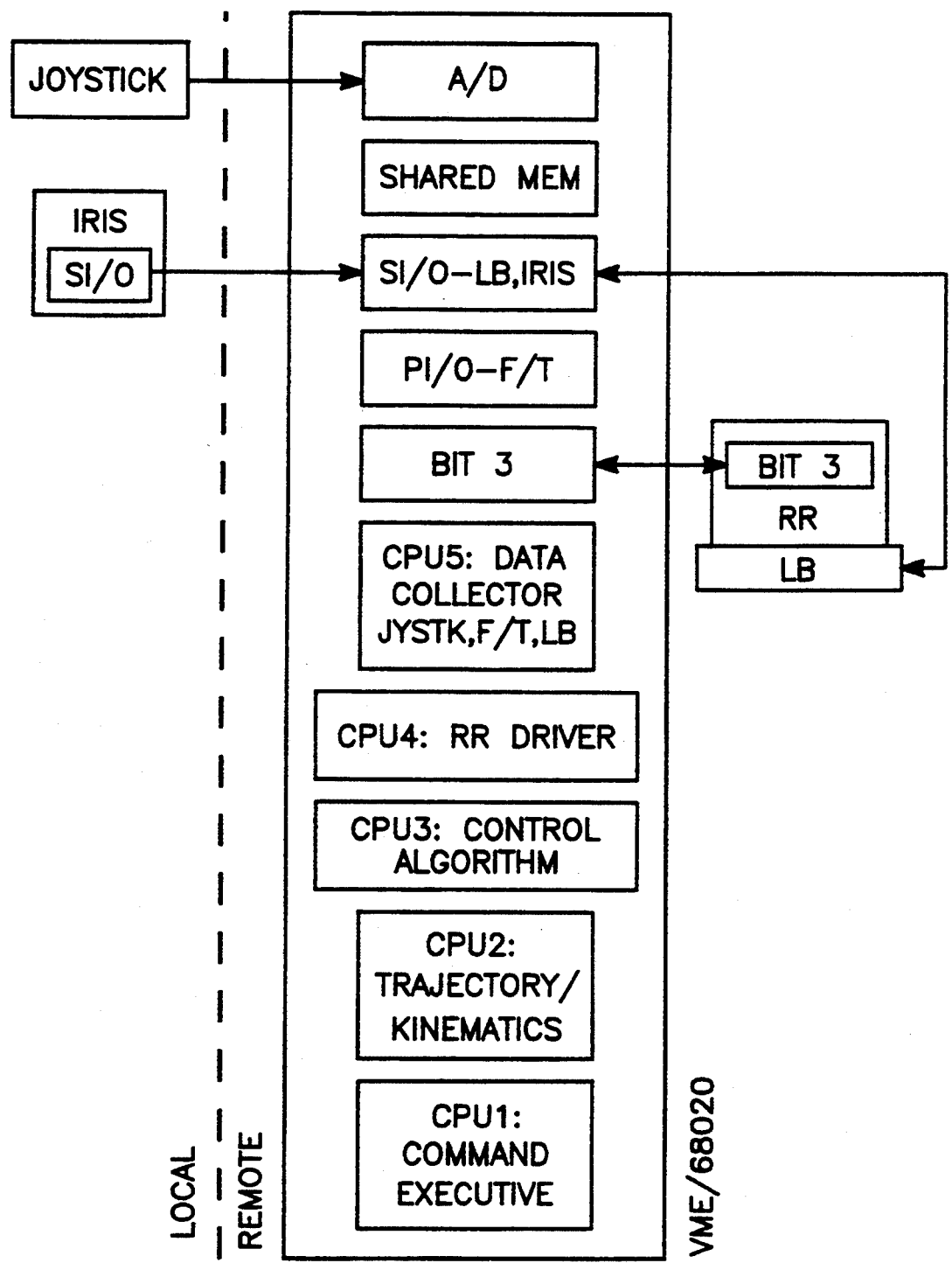
FIG. 11 is a block diagram of a hardware system employed in carrying out one embodiment of the present invention.
Figure 12A:
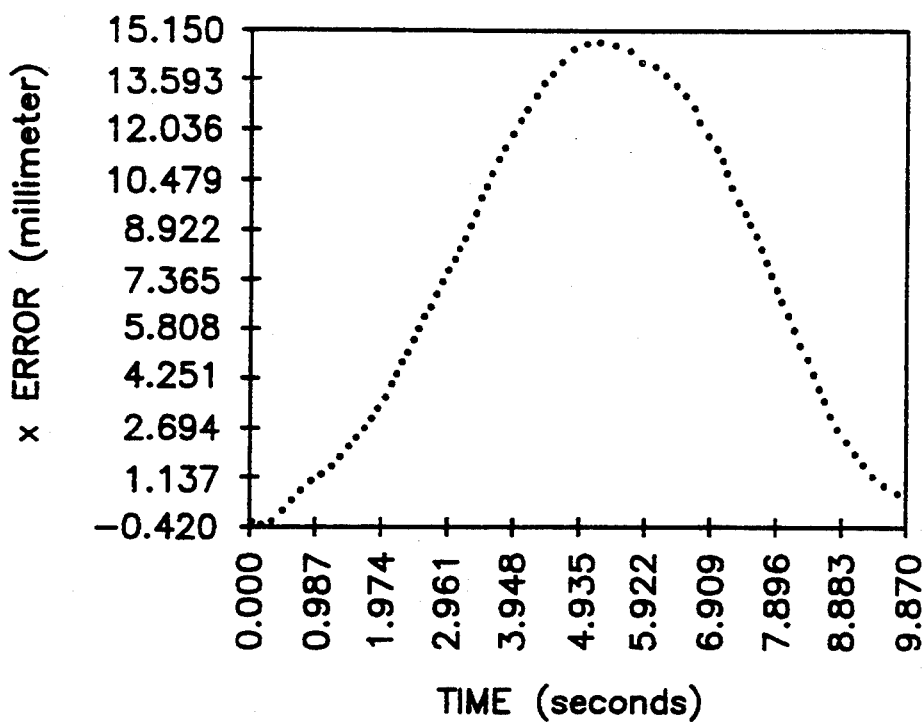
Figure 12B:
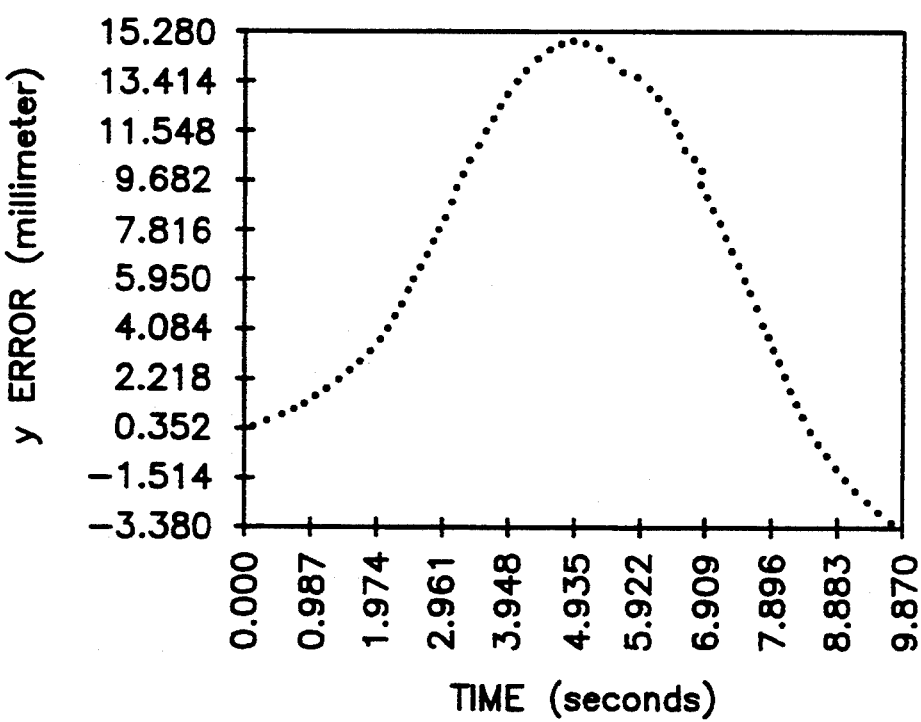
Figure 12C:
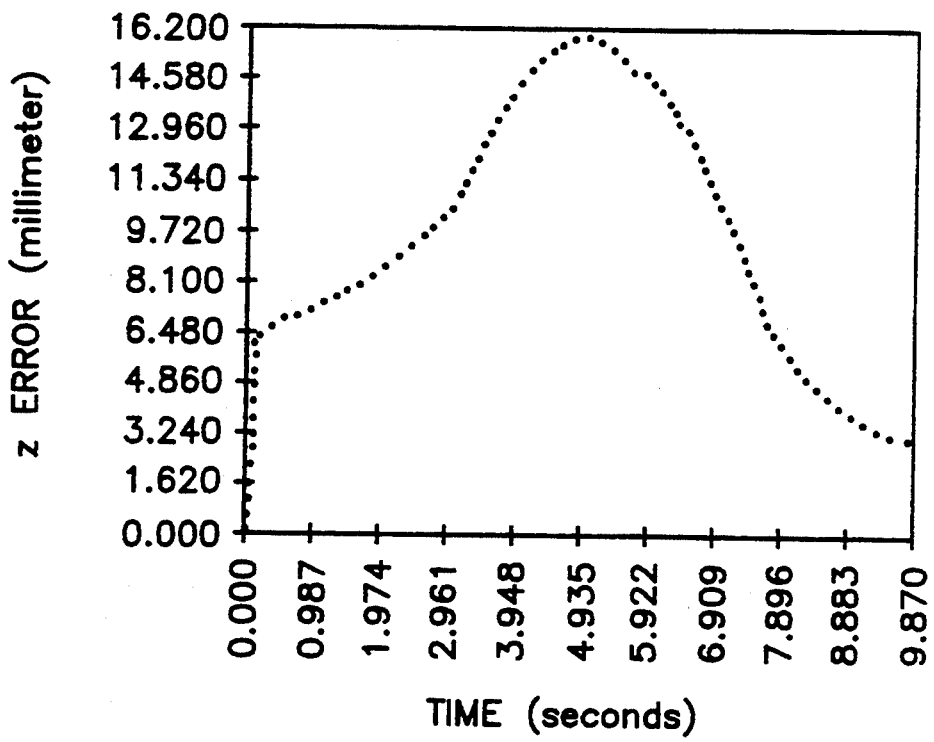
Figure 12D:
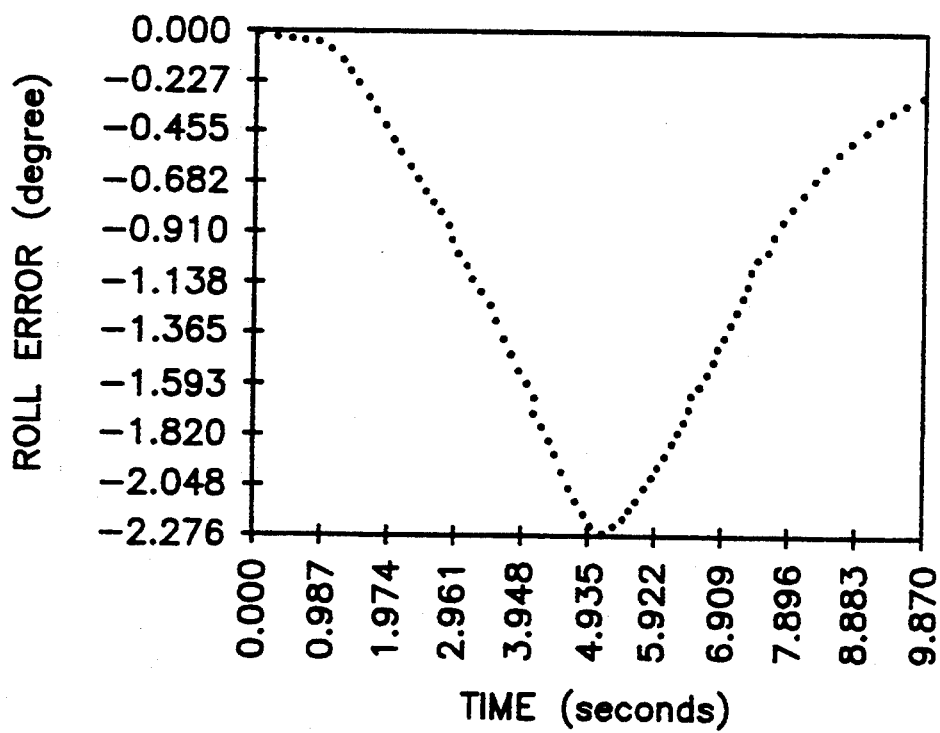
Figure 12E:
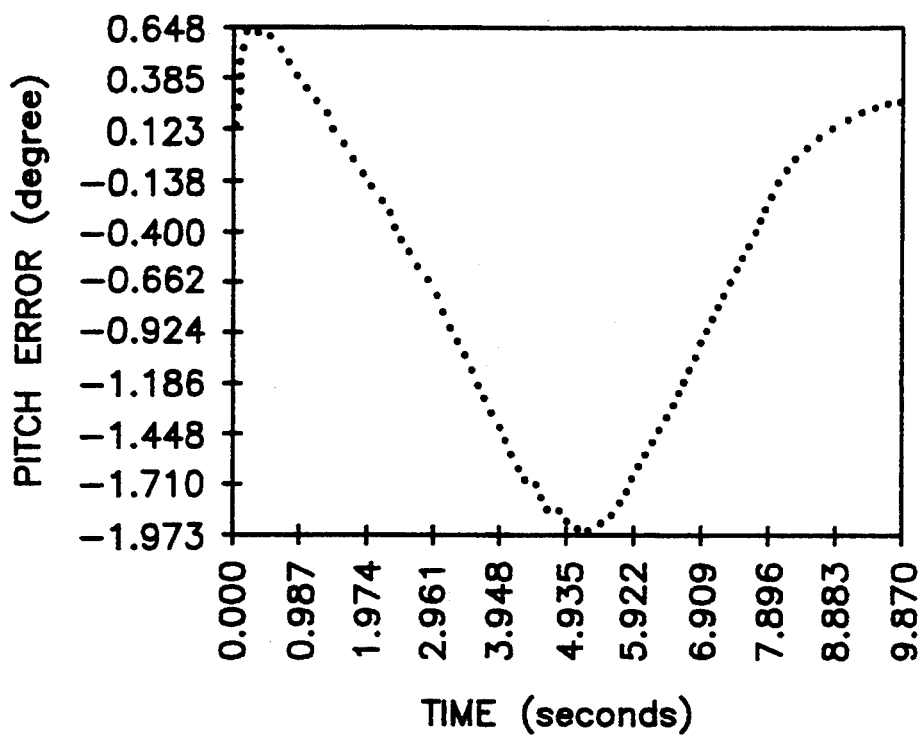
Figure 12F:
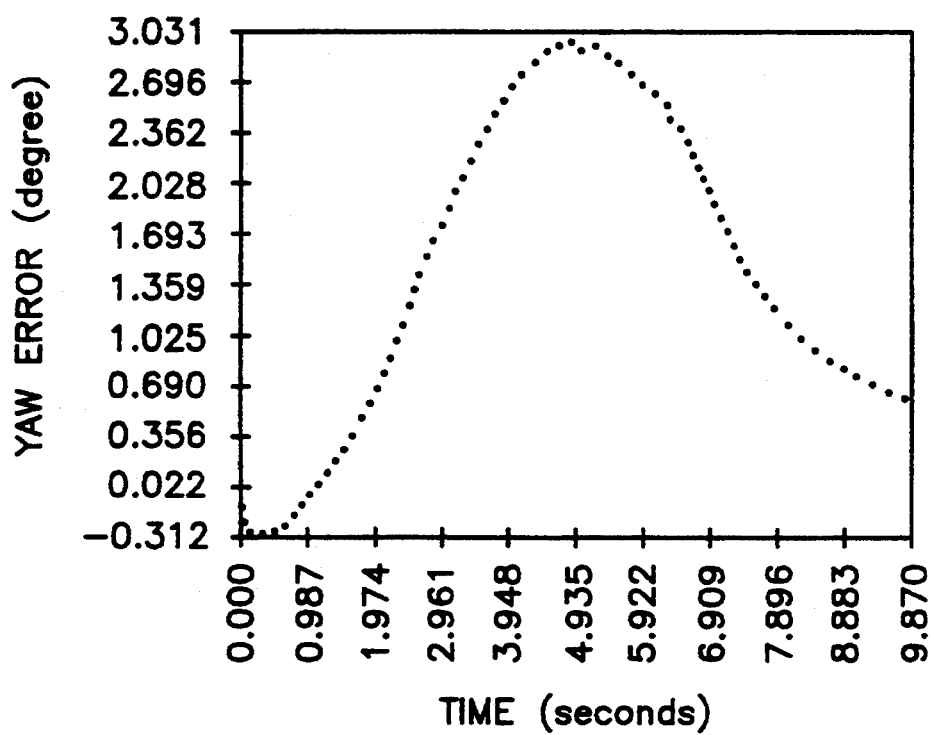

The hardware diagram of the experimental setup is shown in FIG. 11. The IRIS can operate in two different modes. First, it creates an interactive graphics simulation environment for analysis and control of the 7 DOF arm, as discussed in Section 3. Second, the IRIS serves as the graphical user interface through which the operator interacts with the actual arm in real-time and issues motion commands in joint or task space. Using this dual-mode functionality, the IRIS can be used initially in "preview mode" for animating the task scenario, and subsequently in "execution mode" to command the arm to duplicate the simulated motion. The software which provides graphical user interface and simulation capabilities resides on the IRIS.

The VME-based real-time robot control system receives commands from the IRIS to move the actual arm. This is the part of the system which handles all real-time operations including computation of control laws and transmission of appropriate signals to the multibus-based arm control unit. The control unit dispatches the commands for execution to the seven joint motors of the arm to perform the task. The VME chassis configuration contains five CPU boards that communicate through a shared memory board to perform all the necessary computations to provide real-time manipulator control. The first CPU interfaces with the high-level software residing on the IRIS, receives commands from the operator and obtains acknowledgment and state information from the low level after command execution. This processor also serves as the master by scheduling the synchronous operations of the slave processors that perform the real-time computations. The second CPU performs real-time trajectory generation and kinematic computations. This includes generating the desired end-effector trajectories and computing the necessary kinematic and Jacobian transformations. The second CPU also accesses and updates the world model and performs computations to resolve the manipulator redundancy. The third CPU is designated to perform all the computations associated with invoking various dynamic control algorithms (not used at present). The fourth CPU solely communicates with the arm control unit by executing the arm interface driver at every 2.5 milliseconds. A two-card VME-to-multibus adaptor set from the BIT3 Corporation is employed to provide shared memory servo interface with the arm control unit at high speed. The role of the driver is to perform handshake with the arm control unit and to convert data into appropriate format for usage. Some of its features include translating data representation in the multibus to VMEbus format and vice versa and safety checking to avoid hitting physical joint limits and collision with the floor. The fifth CPU hosts various drivers that manipulate the shared memory board which contains global memory formation, read in joystick inputs, control the motorized lathe-bed, and interface with other devices such as a force/torque sensor and a gripper. All software executing on the VME environment is written in the "C" language. Code is developed on a SUN 3/60 UNIX computer utilizing SUN's "C" compiler and Wind River's VxWorks/Wind real-time library. The code is then downloaded through Ethernet to the target processor boards for immediate execution.

To perform initial experiments, a computer program is written for trajectory generation, kinematic computations, and arm interface via the driver. At the present time, all of these computations are performed sequentially on one MC68020 processor with a cycle period of 25 milliseconds. First, a simple cycloidal Cartesian-space trajectory is generated based on the operator's input of the desired arm goal configuration. The $7 \times 1$ arm configuration vector X includes the $6 \times 1$ vector Y of position and orientation coordinates of the hand and the scalar arm angle $\Psi$ for redundancy resolution. At each computation cycle, the output from the trajectory generator is the $7 \times 1$ vector of Cartesian increments ΔX. The 7×7 augmented Jacobian J is also computed which embodies the redundancy resolution goal, namely Ψ control in this case. The Jacobian is then inverted and multiplied by the Cartesian increments to generate the seven joint increments $\Delta\theta = J^{-1}\Delta X$. Finally, the joint setpoints are computed by adding the increments to the current joint angles and are dispatched to the arm interface driver to move the arm under position mode.

In the present implementation, because of the slow sampling rate of 25 milliseconds, the Jacobian matrix J is computed using the desired joint angles instead of the actual joint angles. In addition, the Cartesian increment ΔX is calculated using the difference between the two consecutive desired Cartesian setpoints, not by subtracting the actual Cartesian values from the desired Cartesian setpoints. To improve performance, we plan to increase the servo rate by splitting the algorithm on two MC68020 processors. The first processor will be designated solely to communicate with the arm at every 2.5 milliseconds (running the driver as CPU 4). The second processor will perform cycloidal trajectory generation and Jacobian computation and version. The first processor will then obtain the joint setpoints at every 25 milliseconds, but will linearly interpolate these points into ten via-points which are then sent one at a time to the arm controller every 2.5 milliseconds.

In the experiment, the Robotics Research arm is initially at the predefined Cartesian "home" ("cstart") position with the end-effector coordinates (x, y, z, roll, pitch, yaw) and arm angle Ψ as X(0)=[−900, 297, 316, 0°, 0°, 44°, 60°] measured relative to a fixed reference frame attached to the shoulder, where the lengths are millimeters and the angles are in degrees. This position corresponds to the joint angular values of $\theta(0)$=[−63°, −61°, 78°,−88°, 79°, −85°, 159°] which is away from the arm singular configuration. Data are collected as all seven Cartesian coordinates move simultaneously from the "cstart" position to the user-specified goal position X(τ)=, where the motion duration τ is chosen as 10 seconds. This corresponds to the hand translational motion of 866 millimeters. Preliminary experimental results which demonstrate trajectory tracking are presented in FIGS. 12a–12g. For each end-effector coordinate (x, y, z, roll, pitch, yaw) and the arm angle Ψ, the tracking-error is computed by using the difference between the actual trajectory and the desired trajectory. Note that the maximum error occurs in the middle of the trajectory, i.e. at time t=τ/2=5 seconds. This is because for a cycloidal position trajectory, the velocity is at its peak in the middle of the trajectory, which attributes to the maximum occurrence of linearization errors. From FIGS. 12a–g, in each positional coordinate, the maximum tracking-error does not exceed 16 millimeters, and in each orientational coordinate, the maximum error is less than 3 degrees. Therefore, the experimental results demonstrate the efficacy of configuration control for the 7 DOF arm. Note that the tracking performance will be improved considerably when the computations are split on two processors so that the joint setpoints are updated every 2.5 milliseconds.

5. Conclusions

The problem of motion control of 7 DOF arms is addressed in this paper. To provide dexterous motion of the arm, the configuration control approach is adopted in which the redundancy in joint space is effectively transferred into task space by adding a user-defined kinematic constraint to the end-effector task. The configuration control schemes are robust when singularities are encountered and allow the user to assign appropriate priorities to the task requirements. In this paper, applications of configuration control approach to motion control of the 7 DOF Robotics Research arm are described. Diverse redundancy resolution goals such as elbow control, collision avoidance and optimal joint movement are demonstrated using computer graphics simulations. A simple laboratory experiment on configuration control of the Robotics Research arm is described, and experimental results are presented.

In contrast to Jacobian pseudoinverse methods which resolve the redundancy in joint space, the configuration control approach provides direct control of the manipulator in task space, where the task is performed. Furthermore, unlike pseudoinverse methods, the redundancy resolution goal is not restricted to optimization of a kinematic objective function. Finally, in contrast to pseudoinverse methods which do not ensure cyclicity of motion [22], the configuration control approach guarantees cyclic (i.e., conservative) motions of the manipulator, which is particularly important for repetitive tasks. By way of an example, in a 7 DOF arm under pseudoinverse control, the elbow is allowed to move without restraint during the hand motion, and the arm assumes different configurations for a closed-path hand movement [23]; whereas under configuration control, both of these problems are circumvented.

Current work is focused on expanding the redundancy resolution goals, improving the computational efficiency, and performing further experiments on real-time motion control of the 7 DOF Robotics Research arm.

While the invention has been described in detail by specific reference to preferred embodiments thereof, it is understood that variations and modifications may be made without departing from the true spirit and scope of the invention.

What is claimed is:

1. A method of controlling a robot arm, said robot arm comprising n joints, joint angle sensor means connected to each of said joints, joint servo loop means connected to each of said joints, and two ends comprising a fixed pedestal end and a movable hand end, each of said joints having a joint angle specifying a rotational orientation of said joint, said hand end having m degrees of freedom of movement, wherein m is less than n whereby said robot arm characterized by a degree of redundancy, n−m, said method comprising:

first defining a first m-by-n matrix for defining location and orientation of said hand end in terms of said rotation angles of said joints;

second defining a second r-by-n matrix for defining r user-specified kinematic functions in terms of said joint angles, wherein r is a positive integer exceeding the degree of redundancy of said robot arm;

combining said first and second matrices to produce an augmented m+r-by-n matrix; and computing in accordance with forward kinematics from said augmented m+r-by-n matrix and from the joint angles sensed by said joint angle sensor means a set of n desired joint angles and transmitting said set of n desired joint angles to said joint servo loop means to control the robot arm.

2. The method of claim 1 wherein each of said kinematic functions defines a constraint in one of (a) location, (b) orientation and (c) configuration of a specified portion of said arm.

3. The method of claim 1 wherein said computing operates in successive iterations, said joint angles sensed by said joint angle sensor means correspond to a current one of said iterations and said set of n desired joint angles correspond to a next one of said iterations.

4. The method of claim 1 wherein said first m-by-n matrix, second r-by-n matrix and augmented m+r-by-n matrix comprise Jacobian matrices.

5. The method of claim 1 wherein said robot arm has an anthropomorthic structure and one of said joints is an elbow joint, wherein a pair of links of said arm joined together by said elbow joint define an elbow plane of said arm, and wherein one of said kinematic functions comprises means for defining an orientation of said elbow plane.

6. The method of claim 1 wherein one of said kinematic functions minimizes a sum of gravitational torques on at least some of said joints.

7. The method of claim 1 wherein at least one of said kinematic functions constrains location of said arm.

8. The method of claim 1 wherein at least one of said kinematic functions minimizes a sum of selected mechanical parameters of at least some of said joints.

9. The method of claim 8 wherein said parameters comprising different weighting coefficients for different ones of said joints.

10. The method of claim 9 further changing said weighting coefficients during movement of said arm.

11. The method of claim 8 wherein one of said mechanical parameters comprises velocity errors of said joints with respect to desired velocities.

12. The method of claim 8 wherein one of said mechanical parameters comprises joint angle errors with respect to desired joint angles.

13. The method of claim 5 wherein:
a second one of said kinematic functions minimizes a sum of gravitational torques on at least some of said joints;
a third one of said kinematic functions constrains location of said arm; and
a fourth one of said kinematic functions minimizes a sum of selected mechanical parameters of at least some of said joints.

14. The method of claim 1 wherein at least one of said user-specified functions corresponds to one of:
i. joint locking;
ii. joint limit avoidance;
iii. manipulability maximization.

15. A method of controlling a robot arm, said robot arm comprising n joints, joint angle sensor means connected to each of said joints, joint servo loop means connected to each of said joints, and two ends comprising a fixed pedestal end and a movable hand end, each of said joints having a joint angle specifying a rotational orientation of said joint, said hand end having m degrees of freedom of movement, wherein m is less than n whereby said robot arm characterized by a degree of redundancy, n-m, said method comprising:
first defining a first m-by-n matrix for defining location and orientation of said hand end in terms of said rotation angles of said joints;
second defining a second r-by-n matrix for defining r user-specified kinematic functions in terms of said joint angles, wherein r is a positive integer exceeding the degree of redundancy of said robot arm, and wherein at least one of said kinematic functions minimizes a sum of selected mechanical parameters of at least some of said joints and said selected mechanical parameters include different weighting coefficients for different ones of said joints, said weighting coefficients being able to be changed during movement of said arm;
combining said first and second matrices to produce an augmented m+r-by-n matrix; and
computing in accordance with forward kinematics from said augmented m+r-by-n matrix and from the joint angles sensed by said joint angle sensor means a set of n desired joint angles and transmitting said set of n desired joint angles to said joint servo loop means to control the robot arm.

16. The method of claim 15 wherein said computing operates in successive iterations, said joint angles sensed by said joint angle sensor means correspond to a current one of said iterations and said set of n desired joint angles correspond to a next one of said iterations.

17. The method of claim 15 wherein said first m-by-n matrix, second r-by-n matrix and augmented m+r-by-n matrix comprise Jacobian matrices.

18. The method of claim 15 wherein said mechanical parameters comprise velocity errors of said joints with respect to desired velocities.

19. The method of claim 15 wherein said mechanical parameters comprise joint angle errors with respect to desired joint angles.

20. A method of controlling a robot arm, said robot arm comprising n joints, joint angle sensor means connected to each of said joints, joint servo loop means connected to each of said joints, and two ends comprising a fixed pedestal end and a movable hand end, each of said joints having a joint angle specifying a rotational orientation of said joint, said hand end having m degrees of freedom of movement, wherein m is less than n whereby said robot arm characterized by a degree of redundancy, n-m, said method comprising:
first defining a first m-by-n matrix for defining location and orientation of said hand end in terms of said rotation angles of said joints;
second defining a second r-by-n matrix for defining r user-specified kinematic functions in terms of said joint angles, wherein r is a positive integer exceeding the degree of redundancy of said robot arm, and wherein at least one of said kinematic functions corresponds to one of,
i. minimizing a sum of gravitational torques on at least some of said joints,
ii. minimizing a sum of selected mechanical parameters of at least some of said joints, said parameters comprising velocity errors of said joints with respect to desired velocities, and
iii. minimizing a sum of selected mechanical parameters of at least some of said joints, said parameters comprising joint angle errors with respect to desired joint angles;
combining said first and second matrices to produce an augmented m+r-by-n matrix; and
computing in accordance with forward kinematics from said augmented m+r-by-n matrix and from the joint angles sensed by said joint angle sensor means a set of n desired joint angles and transmitting said set of n desired joint angles to said joint servo loop means to control the robot arm.

21. The method of claim 20 wherein said computing operates in successive iterations, said joint angles sensed by said joint angle sensor means correspond to a current one of said iterations and said set of n desired joint angles correspond to a next one of said iterations.

22. The method of claim 21 wherein said first m-by-n matrix, second r-by-n matrix and augmented m+r-by-n matrix comprise Jacobian matrices.

23. The method of claim 21 wherein said selected mechanical parameters further include different weighting coefficients for different ones of said joints.

24. The method of claim 23 further changing said weighting coefficients during movement of said arm.

* * * * *